United States Patent
Caldwell, Jr. et al.

(10) Patent No.: US 6,830,159 B2
(45) Date of Patent: Dec. 14, 2004

(54) FILE CABINET CONTAINER

(75) Inventors: Robert C. Caldwell, Jr., Grand Rapids, MI (US); Charles B. Carter, Grand Rapids, MI (US); David Kersjes, Grand Rapids, MI (US); Gardner Klaasen, II, Ada, MI (US)

(73) Assignee: Harbor Steel & Supply Corp., Muskegon, MI (US)

( * ) Notice: Subject to any disclaimer, the term of this patent is extended or adjusted under 35 U.S.C. 154(b) by 0 days.

(21) Appl. No.: 10/225,086

(22) Filed: Aug. 20, 2002

(65) Prior Publication Data

US 2003/0038569 A1 Feb. 27, 2003

Related U.S. Application Data

(60) Division of application No. 09/808,866, filed on Mar. 15, 2001, now Pat. No. 6,588,865, which is a continuation-in-part of application No. 09/510,967, filed on Feb. 21, 2000, now Pat. No. 6,419,332.
(60) Provisional application No. 60/121,464, filed on Feb. 24, 1999.

(51) Int. Cl.[7] .............................................. B65D 43/12
(52) U.S. Cl. ................................... 220/345.1; 220/4.28
(58) Field of Search .......................... 312/257.1, 330.1, 312/333, 348.2, 292; 220/4.28, 254.1, 254.3, 254.7, 345.1, 345.2, 345.4, 7

(56) References Cited

U.S. PATENT DOCUMENTS

| | | |
|---|---|---|
| 264,747 A | 9/1882 | Potts |
| 405,003 A | 6/1889 | Blackledge |
| 471,357 A | 3/1892 | Grundy |
| 503,306 A | 8/1893 | Bever |
| 589,463 A | 9/1897 | Case |
| 593,636 A | 11/1897 | Bamberger |
| 827,761 A | 8/1906 | Stromgren |
| 1,027,701 A | 5/1912 | Deming |
| 1,054,311 A | 2/1913 | Phillips |
| 1,291,296 A | 1/1919 | Waite |
| 1,423,538 A | 7/1922 | Ozabal |
| 1,600,830 A | 9/1926 | Lewis |
| 1,763,724 A | 6/1930 | Rosenthal |
| 2,078,338 A | 4/1937 | Moore |
| 2,196,024 A | 4/1940 | North |
| 2,370,474 A | 2/1945 | Kraft |
| 2,478,470 A * | 8/1949 | Eastman et al. ...... 220/345.1 X |
| 2,530,566 A | 11/1950 | Clark |
| 2,582,421 A | 1/1952 | Essman |
| 2,624,650 A | 1/1953 | DePerales |
| 2,628,880 A | 2/1953 | Kader |
| 2,775,498 A | 12/1956 | Gettel |
| 2,814,542 A | 11/1957 | Gleitsman |
| 3,128,007 A * | 4/1964 | Kops ................... 220/345.1 X |

(List continued on next page.)

FOREIGN PATENT DOCUMENTS

| | | | |
|---|---|---|---|
| DE | 1 094 508 | 12/1960 | |
| FR | 353501 | * 9/1905 | ................. 312/292 |

*Primary Examiner*—James O. Hansen
(74) *Attorney, Agent, or Firm*—Miller, Johnson, Snell & Cummiskey, P.L.C.

(57) ABSTRACT

A file cabinet providing access to files from substantially all sides, and having one or more rotatable tiers, each tier containing a plurality of file containers. Each tier includes a central carrousel support having a plurality of radially extending arms. Mounted to the outer terminus of each arm is a file support assembly, each configured to rotate about a vertical axis between a retracted position and an extended position. Each file support assembly is adapted to suspend a file container thereon to provide detachable storage. The detachable file containers each include a box having an upper frame which suspends the container from the file support assemblies. A top may provided to close each container in a secure manner to protect the container's contents.

5 Claims, 32 Drawing Sheets

U.S. PATENT DOCUMENTS

| | | | | |
|---|---|---|---|---|
| 3,164,428 A | * | 1/1965 | Kesh | 312/213 |
| 3,326,615 A | | 6/1967 | Karper | |
| 3,498,471 A | | 3/1970 | Dirkx | |
| 3,722,972 A | | 3/1973 | Deeds et al. | |
| 3,753,606 A | | 8/1973 | Ozeki | |
| 3,868,916 A | | 3/1975 | Ohlson | |
| 3,876,271 A | | 4/1975 | Skirlock | |
| 3,985,409 A | | 10/1976 | Kneier | |
| 4,050,604 A | * | 9/1977 | Flanders | 312/108 X |
| 4,155,477 A | | 5/1979 | Fosher | |
| 4,236,771 A | | 12/1980 | Summers | |
| 4,239,308 A | | 12/1980 | Bradley | |
| 4,317,606 A | | 3/1982 | Hastings | |
| 4,397,388 A | * | 8/1983 | Quaranta | 312/9.64 X |
| 4,418,970 A | | 12/1983 | Hyder et al. | |
| 4,433,885 A | | 2/1984 | Baker | |
| 4,485,997 A | | 12/1984 | Potter | |
| 4,697,856 A | | 10/1987 | Abraham | |
| 4,723,819 A | | 2/1988 | Ramberg | |
| 4,783,130 A | | 11/1988 | Twellmann | |
| 4,796,960 A | | 1/1989 | Candelas | |
| 4,819,829 A | * | 4/1989 | Rosten et al. | 220/345.3 |
| 4,850,658 A | | 7/1989 | Sandor | |
| 4,901,867 A | | 2/1990 | Petty, Jr. | |
| 4,938,549 A | | 7/1990 | Potter | |
| 5,065,872 A | | 11/1991 | Simon | |
| 5,101,738 A | | 4/1992 | Sideris | |
| 5,107,990 A | * | 4/1992 | Wicherski et al. | 206/366 |
| 5,176,264 A | | 1/1993 | De Palma | |
| 5,281,016 A | | 1/1994 | Brague | |
| 5,310,209 A | | 5/1994 | Holman | |
| 5,328,049 A | * | 7/1994 | Ritzow | 220/315 |
| 5,370,255 A | | 12/1994 | Yang | |
| 5,415,315 A | * | 5/1995 | Ramirez | 220/345.2 |
| 5,423,434 A | | 6/1995 | Chen | |
| 5,456,529 A | | 10/1995 | Cheung | |
| 5,547,273 A | | 8/1996 | Hudnall | |
| 5,669,494 A | | 9/1997 | Geffen | |

* cited by examiner

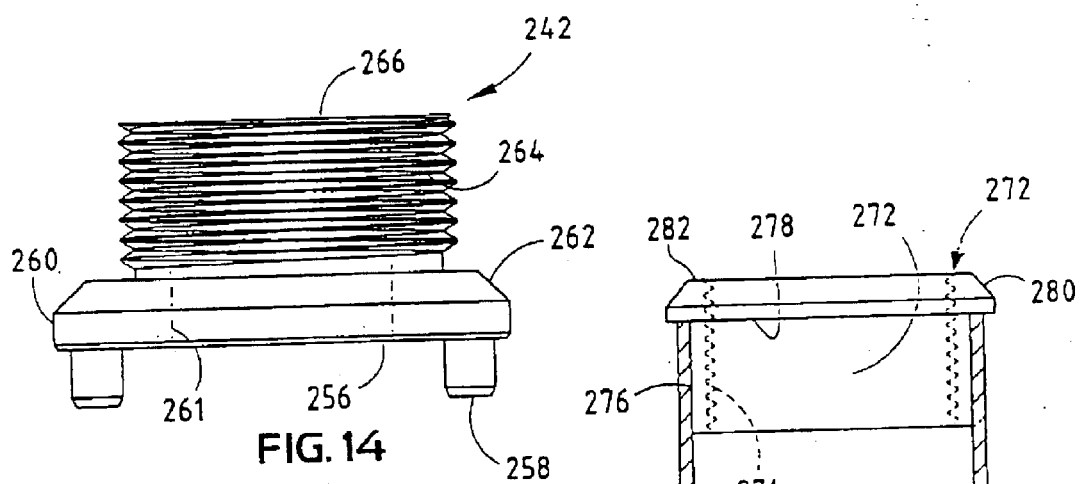
FIG. 14
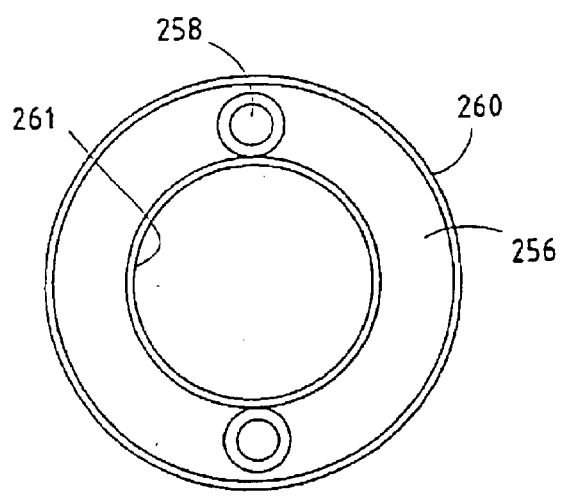
FIG. 15
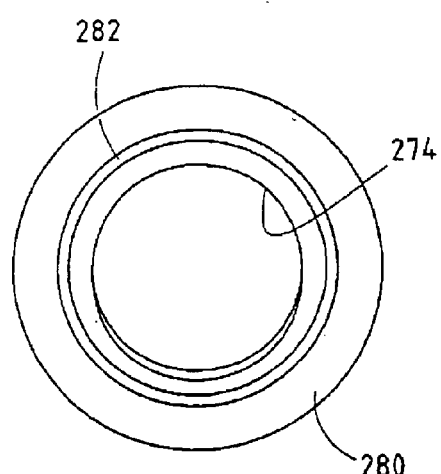
FIG. 16
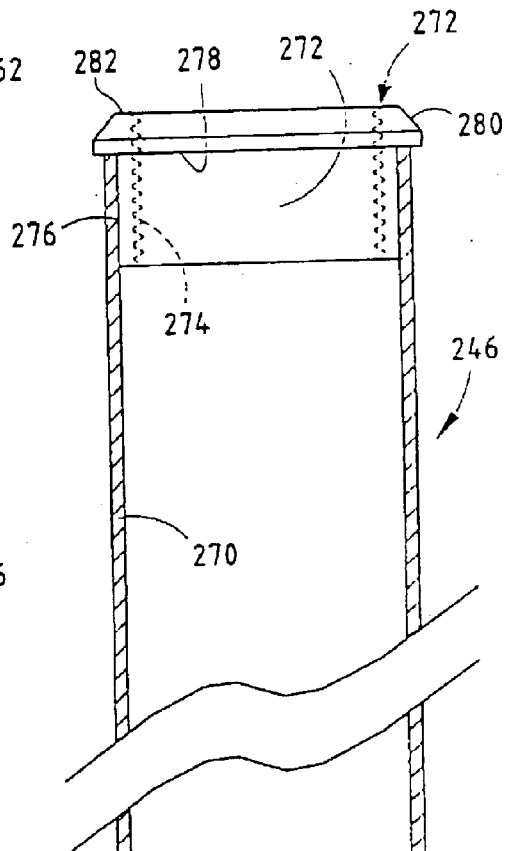
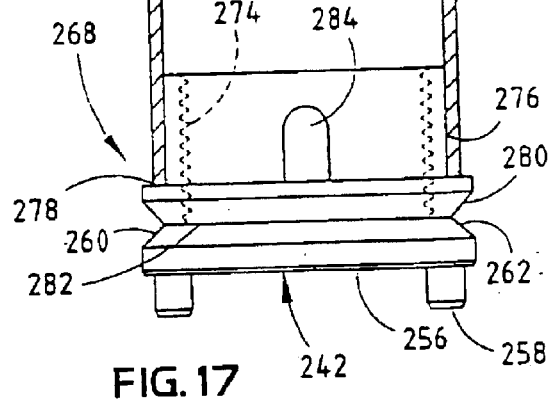
FIG. 17

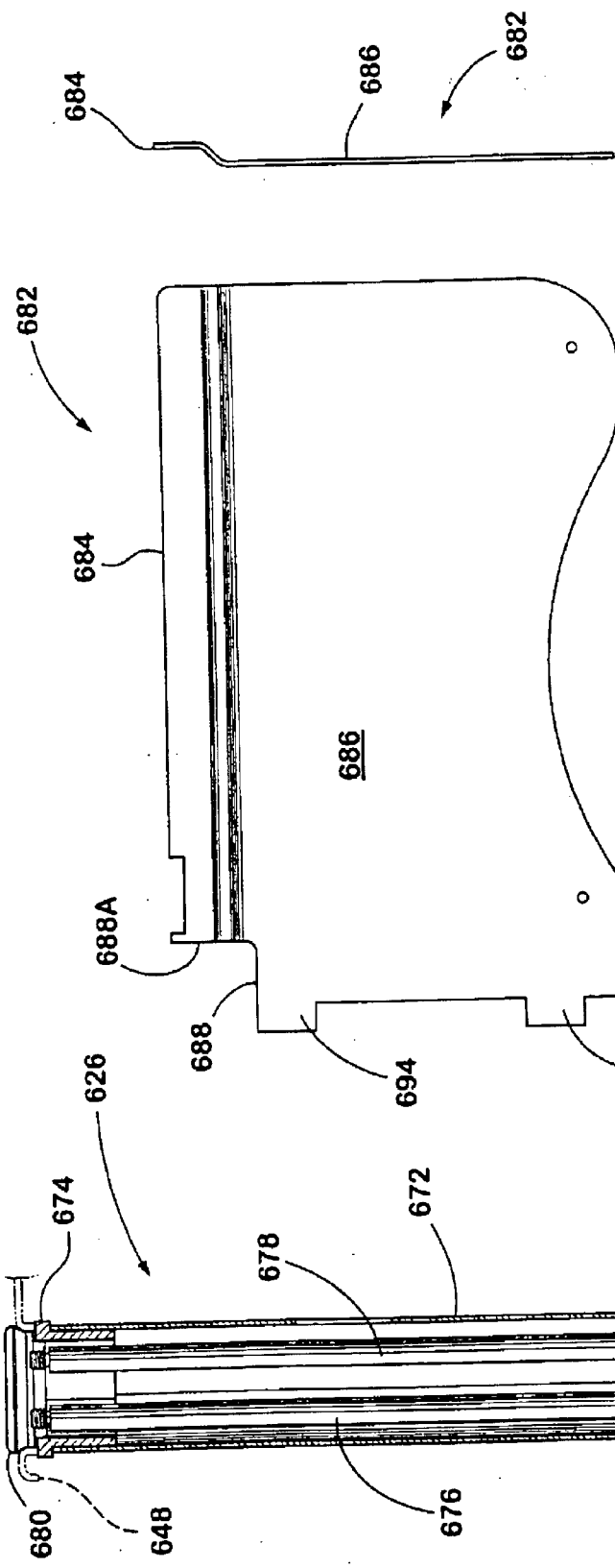

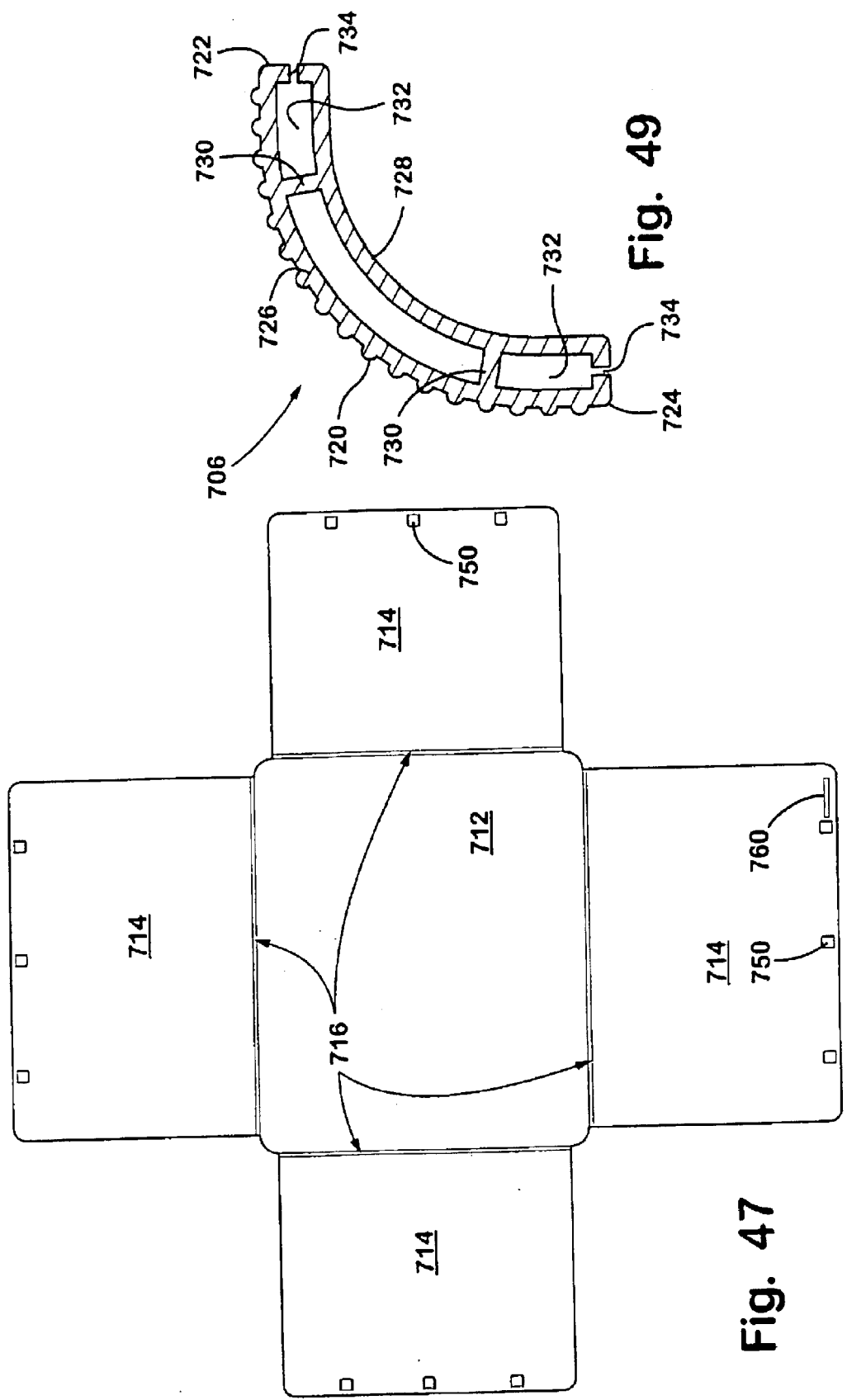

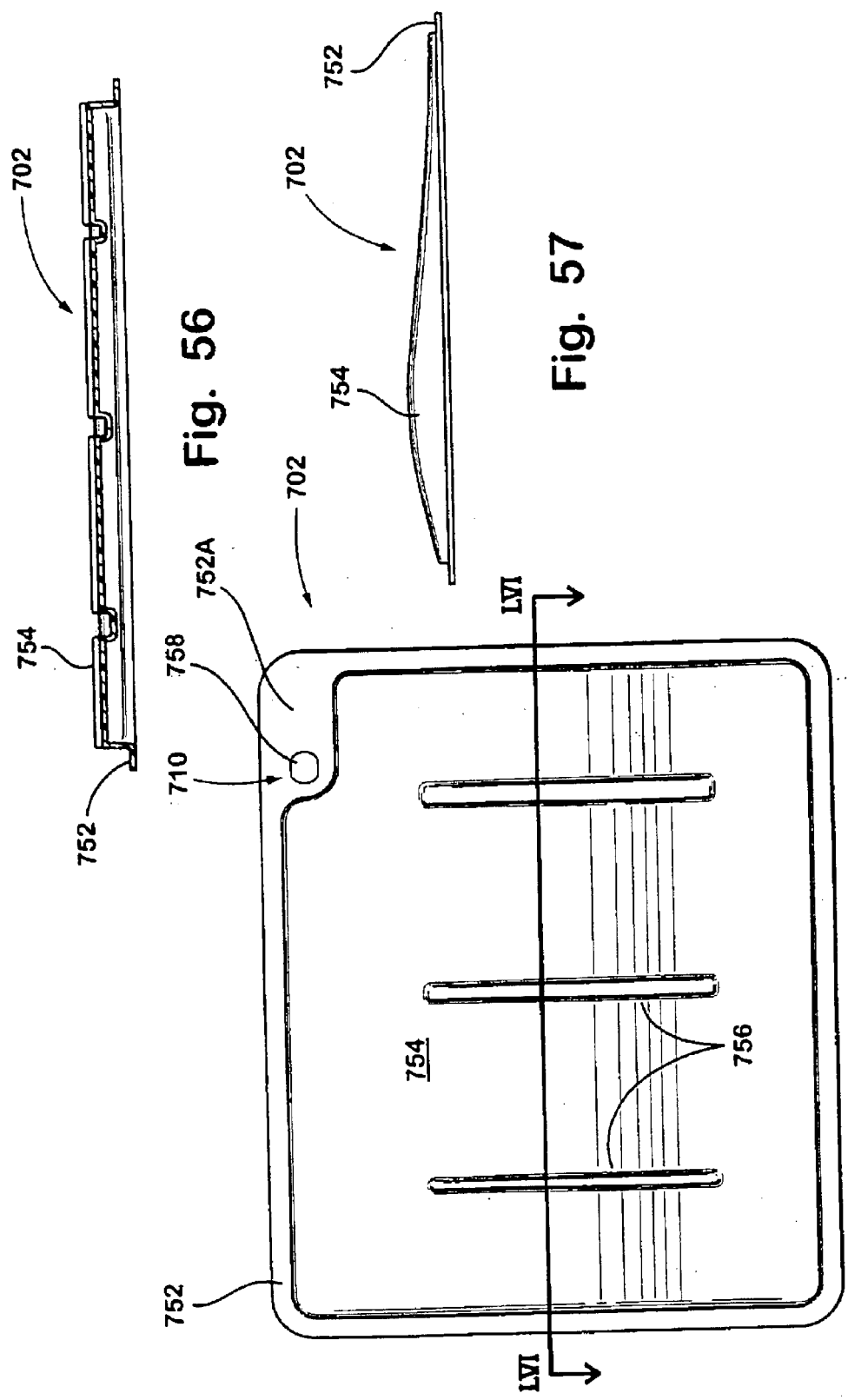

FILE CABINET CONTAINER

REFERENCE TO RELATED APPLICATION

This application is a divisional application of U.S. patent application Ser. No. 09/808,866, filed Mar. 15, 2001, now U.S. Pat. No. 6,588,865, which was a continuation-in-part application of U.S. patent application Ser. No. 09/510,967, filed Feb, 21, 2000, now U.S. Pat. No. 6,419,332, claiming priority from U.S. provisional application Ser. No. 60/121,464, filed Feb. 24, 1999.

BACKGROUND OF THE INVENTION

1. Field of the Invention

This invention relates generally to filing cabinets, file drawers, storage units and the like, and more particularly to a carrousel filing cabinet where more than one drawer may be opened at any one time without fear of the filing cabinet tipping.

2. Discussion of the Related Art

Lateral and vertical filing cabinets typically have drawers extending from one side of the cabinet box frame. To prevent the cabinet from tipping or falling over, the filing cabinet is typically provided with a substantial counterweight at the rear of the box frame to counter the weight of any opened drawer. To prevent an excessive moment arm or load, an interlock mechanism is usually provided which prevents more than one drawer from opening at a time. Examples of such filing cabinets may be found in the following U.S. Pat. Nos.: 3,969,008; 4,355,851; 4,429,930; 4,480,883; and 4,711,505.

Vertical filing cabinets have been designed where the drawers do not extend from the cabinet, but are mounted to a track or linkage mechanism to revolve in a vertical oval pattern within the cabinet. These vertical rotary cabinets require complicated mechanisms to permit user access to a single file drawer. Furthermore, these cabinets are almost always preassembled, requiring a substantial amount of shipping and stocking space.

A need exists for a filing cabinet which maximizes the storage space and permits access to more than one filing drawer without fear of the cabinet tipping over. There is also a need for a filing cabinet which can be shipped disassembled and employs standardized components resulting in minimum shipping and inventory space providing low unit cost.

SUMMARY OF THE INVENTION

The instant invention is directed toward a file assembly which is accessible from all sides, having one or more tiers, with each containing a plurality of file containers. The combination of characteristics presented in each of the designs provides maximum utilization of floor space, provides a safer design unlikely to tip over because of off-center loads, and is accessible by simultaneous users. The design also permits assembly by the users as well as the manufacturer. The kit design requires considerably less packaging and shipping space than prior designs resulting in substantial cost savings.

According to one form of the invention, a central support assembly extends from a base. The upper end of the central support assembly may be configured to receive a top assembly for the cabinet. In its simplest form, a pair of spiders or cross-shaped supports are mounted in spaced-apart location on the central support assembly such that the arms extend radially from the central support. Interconnecting each of the respective ends of the spaced apart spiders are outer pivot tubes. The coupling between the spiders and the outer pivot tubes permits each outer pivot tube to rotate about an axis parallel to that of the central support member. Each outer pivot tube has a file support arm extending generally perpendicularly therefrom which is configured to detachably receive a file container. The file support arm swings about the axis of the outer pivot tube between an extended position and a retracted position.

The file container is also considered to be novel. According to one form of the container, a box assembly is provided having a bottom panel and a plurality of wall panels connected to the bottom panel. Interconnecting each of the adjacent wall panels is a corner member to provide structural support. Interconnecting the upper edge of all of the wall panels is a frame. The frame includes one or more peripheral edges which are configured to engage the file supports such that the box assembly can be suspended on the file support arm. The frame also includes at least one channel slide on its upper surface to receive a top or lid in sliding engagement and close the opening within the frame. The lid may be provided with a lock to secure the contents of the container.

It is contemplated that both the file assembly and the portable container be provided as kits whereby the various components can be assembled by the end user or purchaser. In addition, the file assembly can be built with one or more tiers determined by the user. The configuration is easily adapted to provide the desired number of tiers.

The advantages provided by the invention include a design which may be used in the home office as well as the business office. The design also requires less packaging because of its modular construction which translates into less shipping space producing a cost savings. The flexibility of the design also translates into cost savings as the basic building blocks are used to create one, two, three or four tier designs. Special tooling or parts are not required to produce the various designs. The instant invention provides 360 degrees of accessibility. The rotary tiers enhance access to the different file containers and allow placement of the cabinet against a wall or into a corner. Lastly the cabinet provides a wide range of appearance options. Different from the conventional metal or wood lateral file, the instant invention may include metal or cloth panels in a wide array of colors and patterns. Moreover, each file container may be manufactured from a metal or plastic in a variety of color combinations to provide an aesthetically pleasing appearance.

BRIEF DESCRIPTION OF THE DRAWINGS

FIG. 14 is an elevation view of a nipple extending from the base assembly;

FIG. 15 is a bottom view of a nipple extending from the base assembly;

FIG. 16 is a plan view of a nipple extending from the base assembly;

FIG. 17 is a fragmentary elevation cross section of the central support assembly taken along line XVI—XVI shown in FIG. 12;

FIG. 42 is a section view of the outer pivot tube and file support arm taken along line XLII—XLII shown in FIG. 38;

FIG. 43 is a side elevation view of one embodiment of a pivot an;

FIG. 44 is an end elevation view of the pivot arm shown in FIG. 43;

FIG. 47 is a plan view of the file container bottom and wall panels in a flat configuration;

FIG. 49 is a section view of the corner member along line XLIX—XLIX shown in FIG. 46;

FIG. 55 is a plan view of the file container lid;

FIG. 56 is a longitudinal cross-section of the file container lid taken along line LIV—LIV shown in FIG. 55;

FIG. 57 is an end elevation view of the file container lid; and

DETAILED DESCRIPTION OF PREFERRED EMBODIMENT

Figure 1:
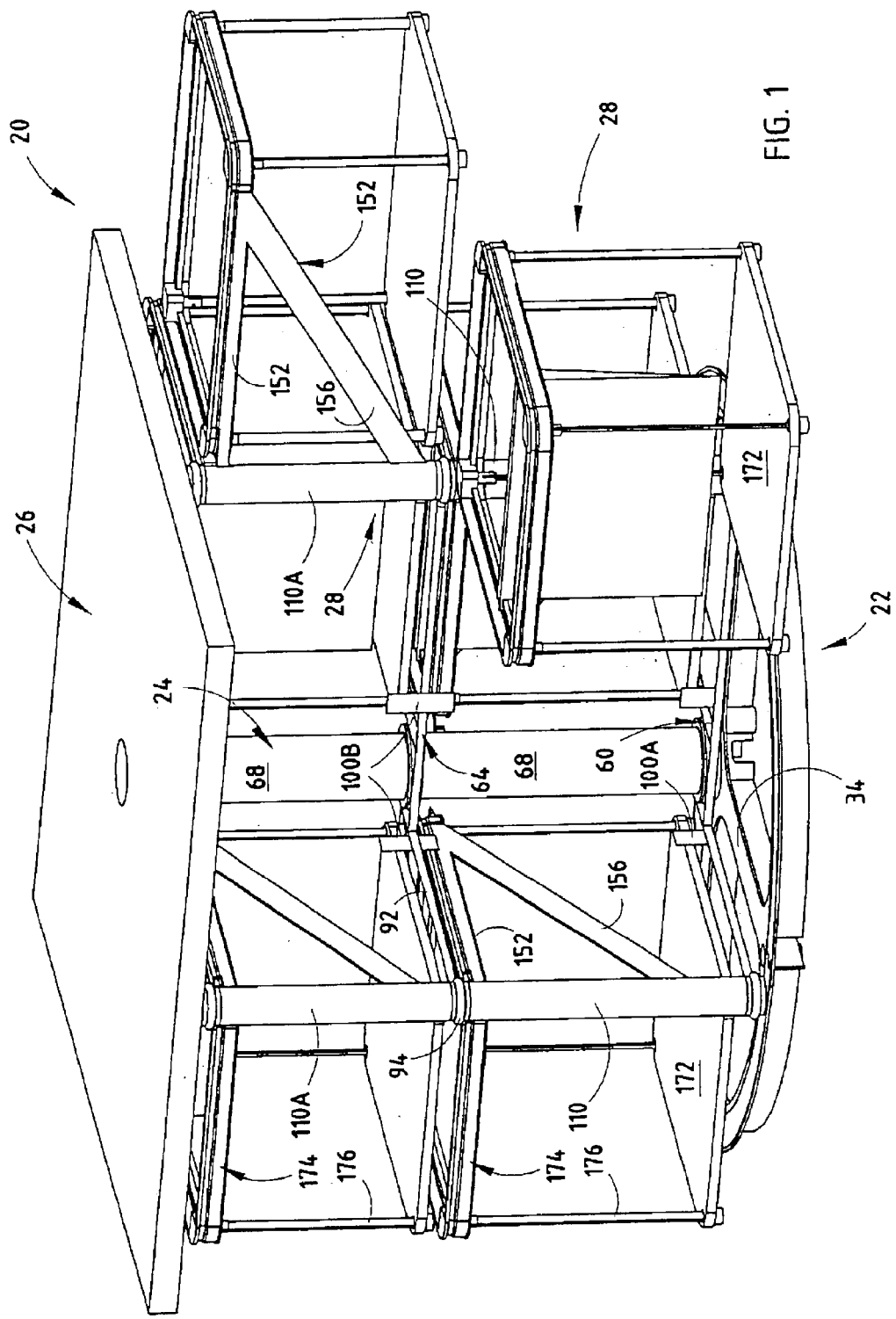
FIG. 1 is an oblique view of a filing cabinet assembly embodying the present invention.

For purposes of the following description, the terms "upper," "lower," "left," "rear," "front," "vertical," "horizontal" and derivatives of such terms shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Specific dimensions and other physical characteristics relating to the embodiments disclosed herein are not to be considered as limiting, unless the claims expressly state otherwise.

Figure 2:
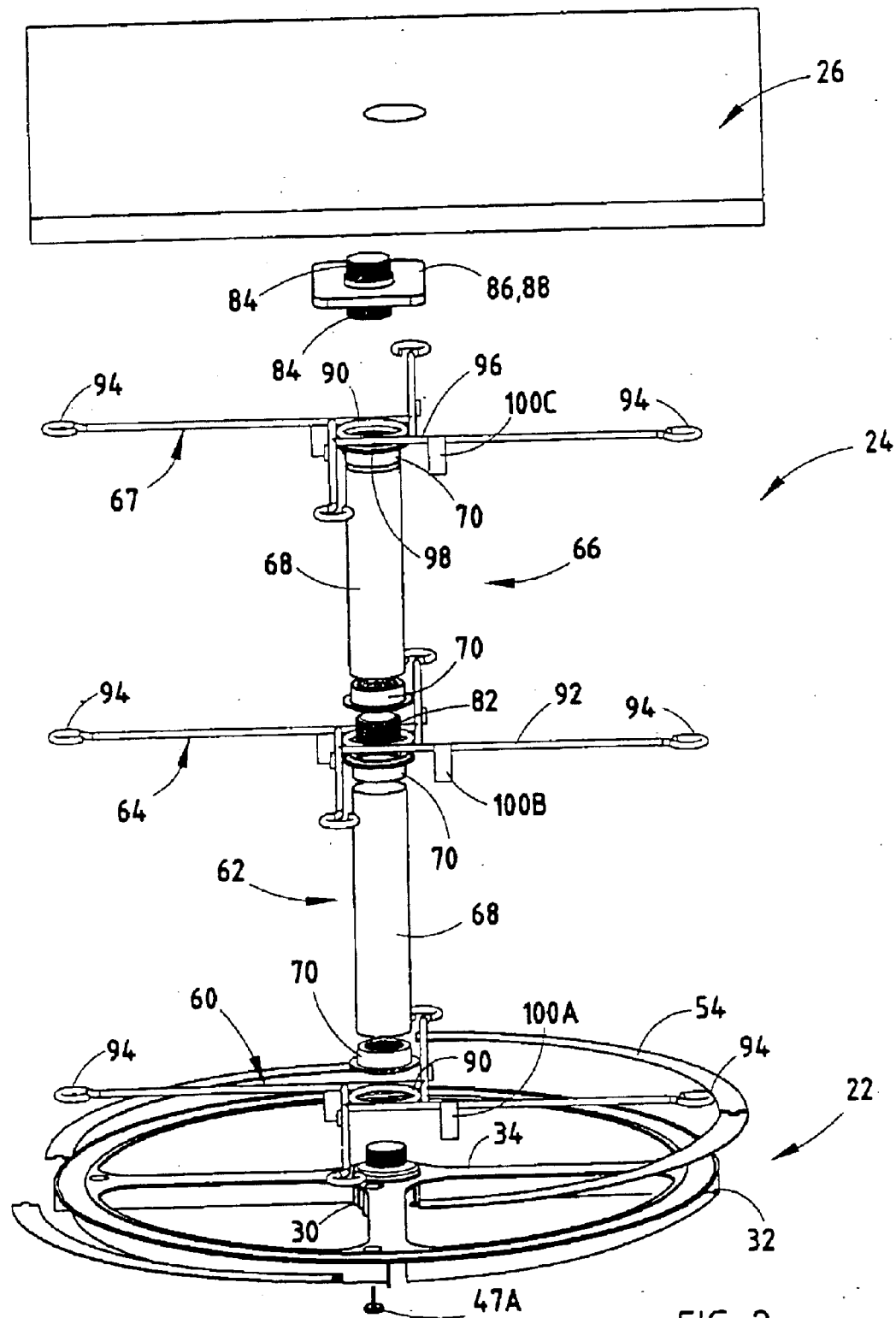
FIG. 2 is an exploded view of a portion of the filing cabinet embodying the invention shown in FIG. 1.
Figure 3:
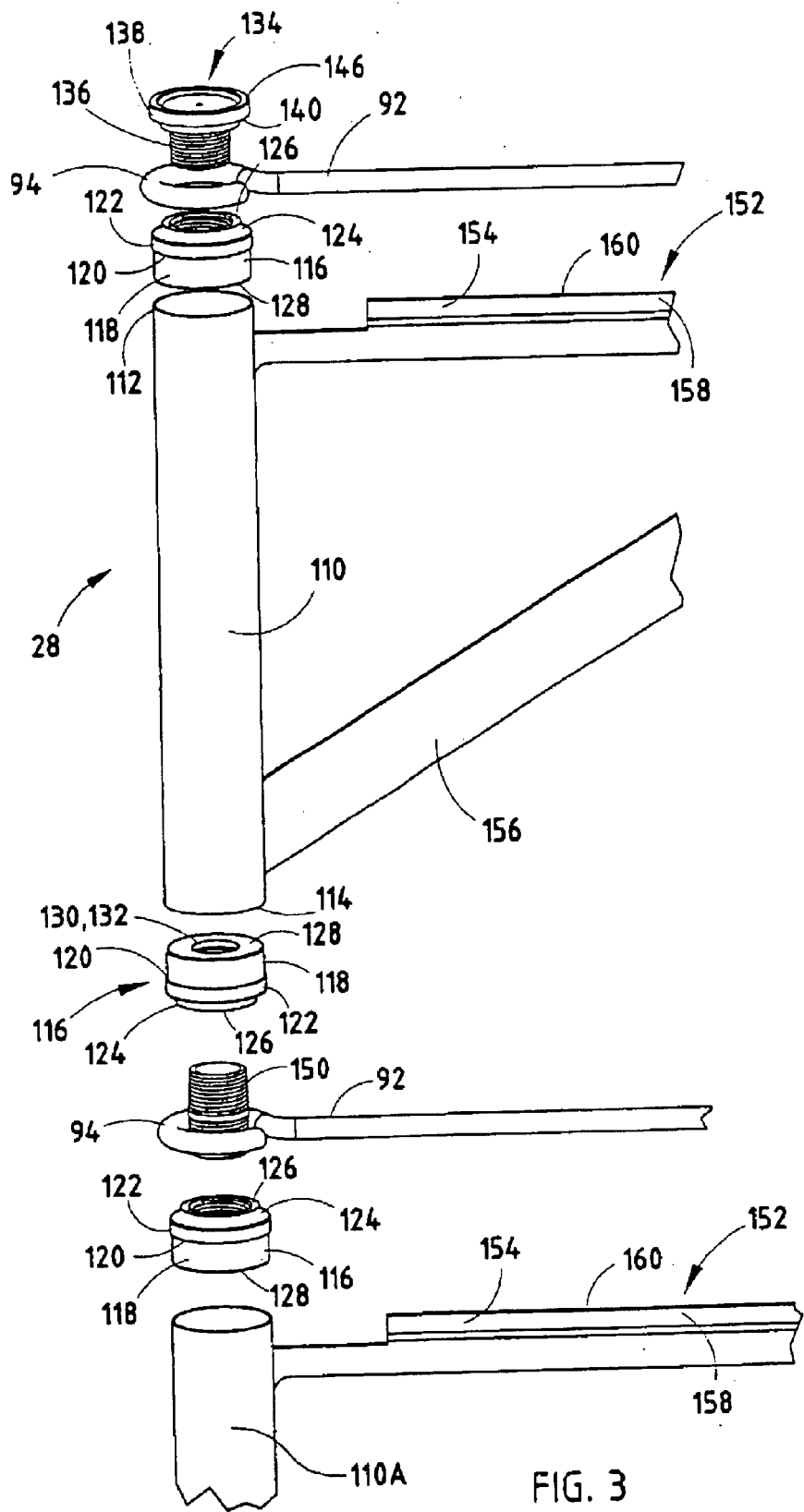
FIG. 3 is an exploded view of a file support assembly used in conjunction with the invention shown in FIG. 2.
Figure 4:
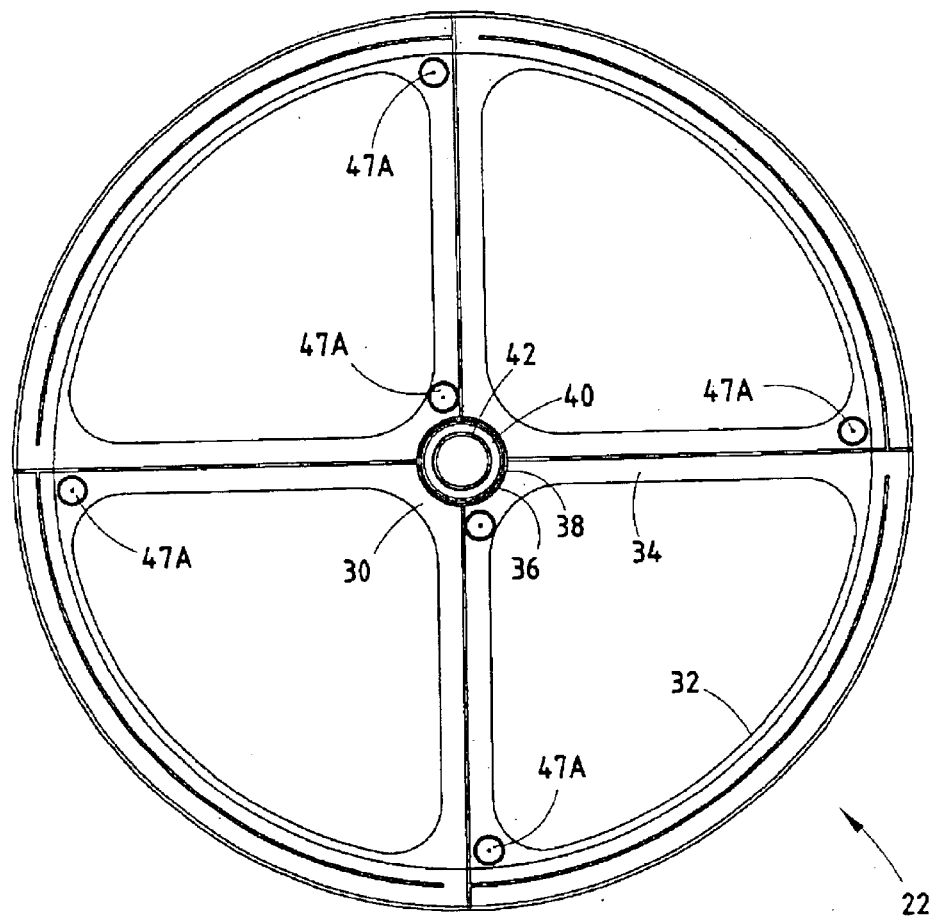
FIG. 4 is a plan view of the base assembly.
Figure 5:
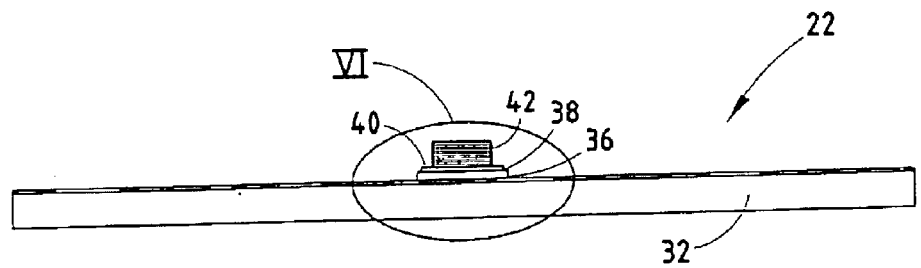
FIG. 5 is an elevation view of the base assembly.

Referring to FIGS. 1–3, cabinet 20 generally includes a base assembly 22, a central support assembly 24, a top assembly 26, and a plurality of file support assemblies generally referenced as 28. Referring to FIGS. 2 and 4–6, one form of the base assembly 22 includes a central hub 30 interconnected to an outer rim 32 by a plurality of spokes 34. In the embodiment shown, four evenly spaced spokes 34 are provided. Hub 30 (FIGS. 5 and 6) is generally higher in relief than the adjoining spokes 34 and in particular includes an upright cylindrical wall 36, the upper reaches of which contain a quarter-round or concave radius annular groove 38. Annular groove 38, in turn, is connected by shoulder 40 to a right circular cylinder nipple 42. The exterior surface of the nipple 42 is preferably threaded for reasons which will apparent below.

The underside 44 of base assembly 22 may be hollow or contain passages. In one embodiment, hub 30 is hollow and includes a plurality of openings 46 each located between spokes 34 to permit passage of cables, wires, and the like down through the central portion of the nipple 42, hub 30 and out between the spokes 34. Rim 32 may also be hollow or define a passage in communication with the hollows or passages beneath spokes 34 and central hub 30. Outer rim 32 includes a recess 48 defined at an upper surface 50 which is generally circular in shape, and disposed proximate peripheral edge 52. Received in the recess 48 in at least one continuous piece, and preferably two or more sections is a metal glide or bearding surface 54 wherein an upper surface 56 extends slightly above surface 50 for reasons which will become apparent below.

Molded into and defined in the lower surface 44 of base assembly 22, and preferably disposed at intervals along spokes 34 and at points proximate hub 30 are leg supports 47. Each leg support 47 includes a female member defined by a right circular cylinder outer wall and having a bottom wall of increased thickness. The cylindrical wall of the leg support is configured to receive a leg defined by a base attached to the end of a shaft. The shaft may be threaded and received in a central hole formed in the base of the leg support to permit adjustment of the base relative to the lower surface of the base assembly. It is contemplated that the leg supports 47 may be formed using the same injection molding process at the time that the entire base assembly is formed. Alternatively, the cylindrical walls for the leg supports may be formed, and the leg and its supporting member may be inserted into the cylindrical member as a separate step. Substantially any supporting member by be provided so long as it permits height adjustment of the base at each location. Another purpose of the legs is to provide a substantially horizontal upper surface 50 on which the filing cabinet is eventually placed. It is contemplated that base assembly 22 may be manufactured from polymeric material using injection molding, pour molding or similar forming processes, or may be cast or machined from steel, aluminum or even wood components.

Figure 6:
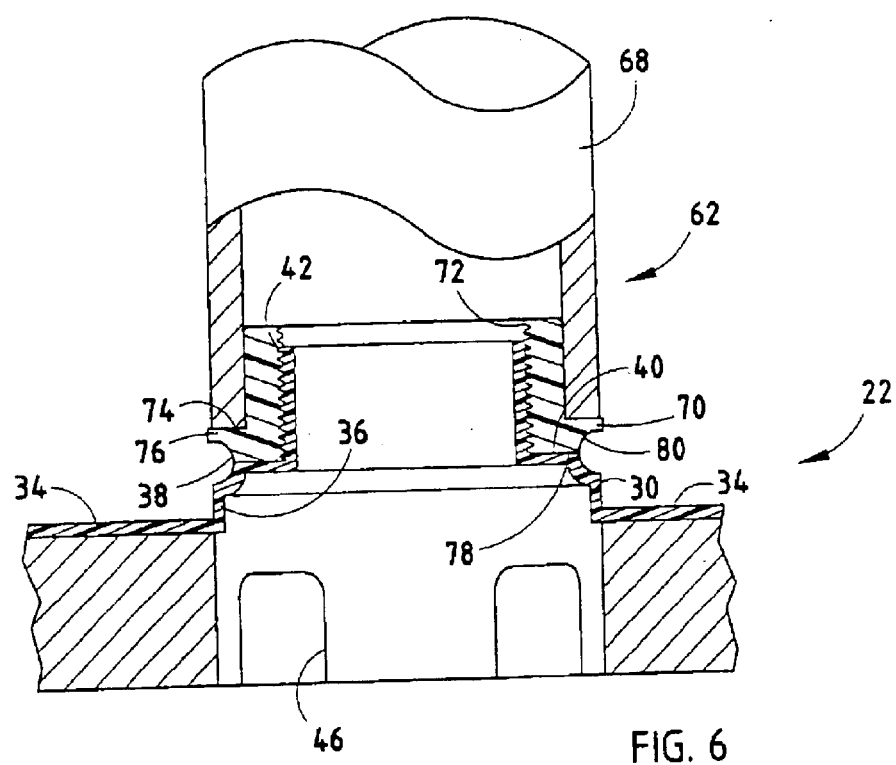
FIG. 6 is a fragmentary cross-sectional view of the base assembly hub and central support shown in FIG. 2.

Referring to FIGS. 2 and 6, threaded nipple 42 receives central support assembly 24. Central support assembly 24 includes a lower spider 60, a lower tube assembly 62, an intermediate cross assembly 64, an upper tube assembly 66, an upper spider 67, which in turn is coupled to the top assembly 26. Each of the lower and upper tube assemblies includes a generally tubular, right circular cylindrical support 68 having a bushing 70 at opposite ends. Each bushing 70, is preferably tubular and includes a concentric axial passage threaded on its interior to mate with the threads on the exterior of nipple 42. One end of each bushing 70 includes a reduced diameter cylinder portion 72 configured to be received in the open end of the support 68 which abuts tightly shoulder 74. At the perimeter of shoulder 74 is a wall 76 which transitions toward end 78 to a quarter-round annular groove 80 complimentary in shape and dimension to the quarter-round annular groove 38 described earlier for example formed in the hub 30 of the base assembly 32. The bushing 70 threaded down tightly against the shoulder 40 of the hub 30 along with the cooperating portions of the annular groove define an annular bearing recess. Disposed in this bearing recess is the lower spider 60 briefly mentioned above.

Referring to FIG. 2, each of the spiders 60, 64 and 67 include a central circular bearing member 90. Each circular bearing member 90 supports a plurality of arms 92. In a preferred embodiment, each arm has an outer end or clevis 94, and is tangentially coupled to the circular bearing member 90 proximate a second and opposite end 96. Moreover, the opposite end 96 is preferably attached to the angularly adjacent arm 92. In this fashion, and in the case four arms 92, a polygon such as a square 98 is defined by those portions of the arms 92 about the circular bearing member 90. In this embodiment, each arm is thus supported at four points about the circular bearing member, rather than at a single point if the arm were cantilevered directly from the bearing member 90.

The circular bearing member 90 of lower spider 60 is captured in the annular bearing recess defined by bushing 70 and hub 30. Likewise, intermediate spider 64 is captured between the respective bushings 70 at the ends of the supports 68 joined together by nipple 82. With respect to the upper spider 67, the bushing 70 at the upper end of the upper tube assembly 66 is threaded to a nipple 84 projecting from a hub 86 extending from an insert 88 retained in the top assembly 26. In one embodiment, the insert 88 may have a rectangular flange at one end of the nipple 84 which is received in a rectangular recess formed in the table top assembly 26. Insert 88 in turn may include a hollow portion extending through the table top to provide a passage for cables and the like. It is contemplated that insert 88 is coupled by fasteners to at the lower side of table top 26.

Although the embodiment in FIG. 2 has been described with three spiders vertically disposed along the two tube assemblies 62 and 66, it is contemplated that a single tube assembly such as 62 may be used to support two spiders. Alternatively, the assembly may be repeated to include as many cross assemblies as desired depending upon the space requirements. Furthermore, each cross assembly shown in FIG. 2 is, without more structure, able to rotate independently about the bearings provided by bushings 70. Bushings 70 are preferably injection molded from a self-lubricating polymeric material to reduce friction between the circular bearing members 90 and the bushings. It is further contemplated that roller bearing or other bearing structures may be used to support the spider and further reduce the friction associated with the rotation of the spiders about the fixed central supports.

Figure 7:
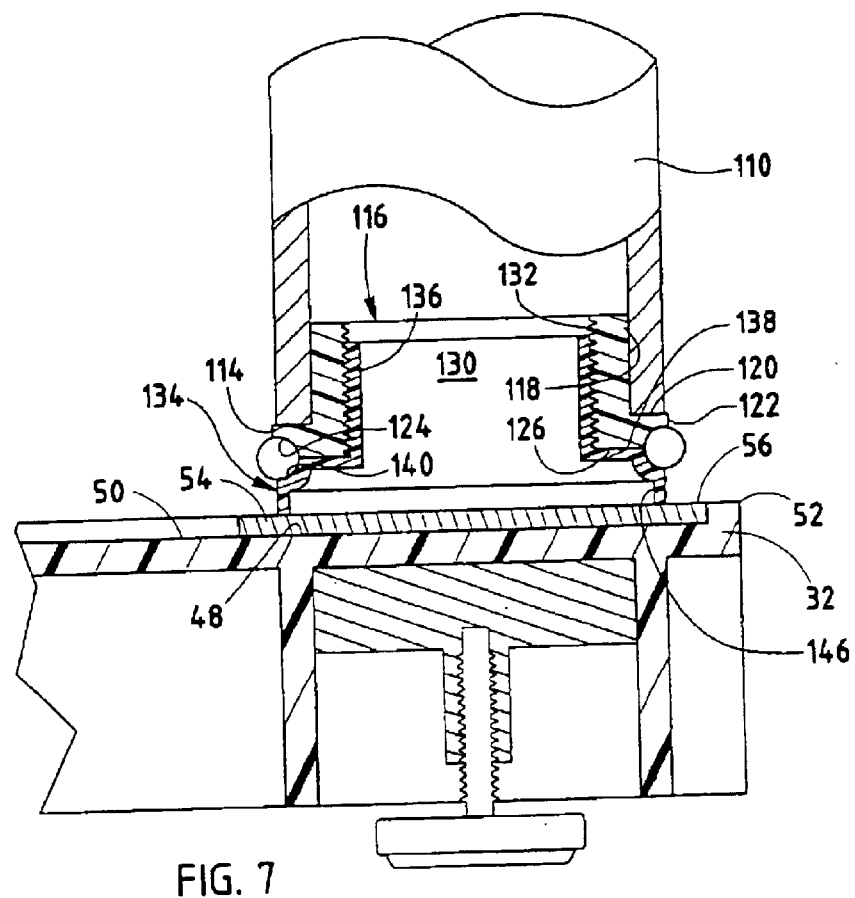
FIG. 7 is a fragmentary cross-sectional view of a portion of the base assembly and file support assembly.
Figure 8:
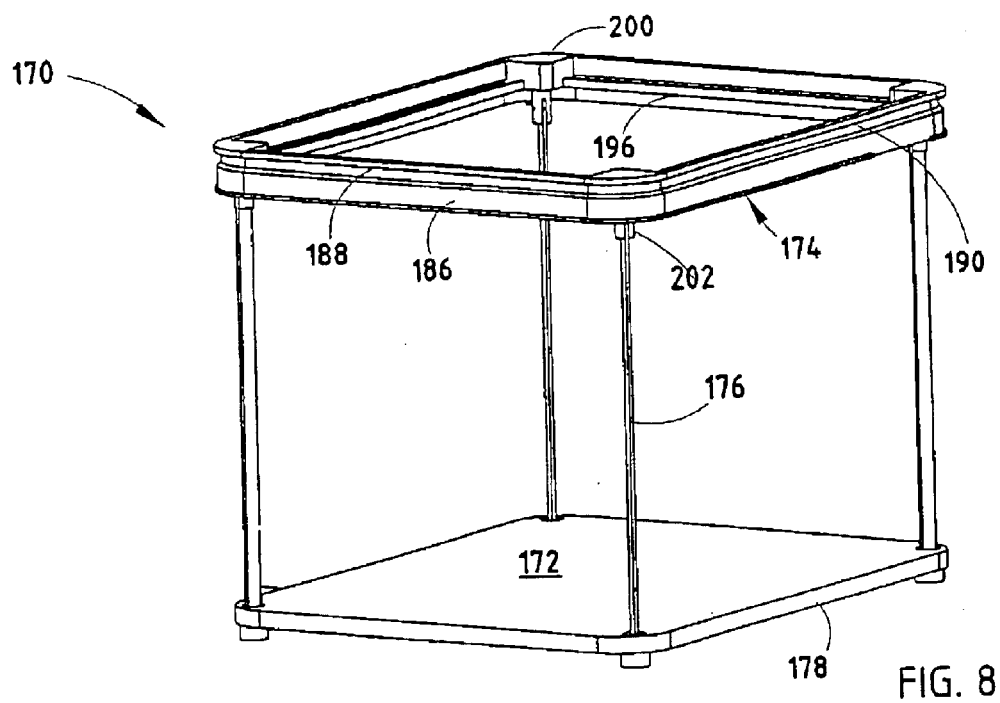
FIG. 8 is an oblique view of one embodiment of a container used in association with the invention.
Figure 9:
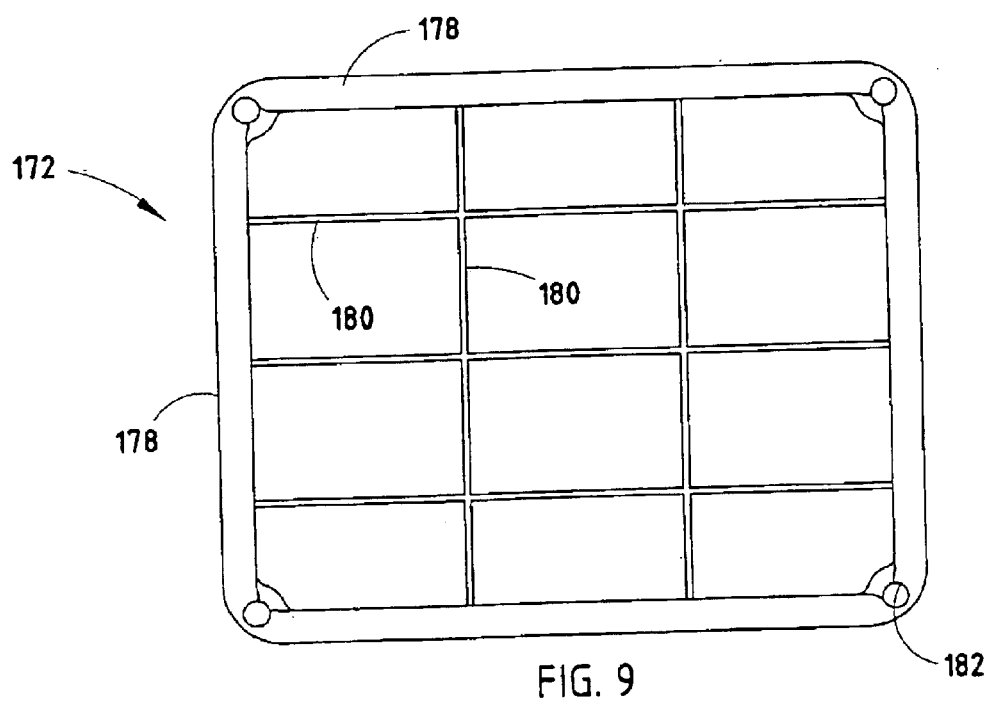
FIG. 9 is a plan view of the container bottom panel.
Figure 10:
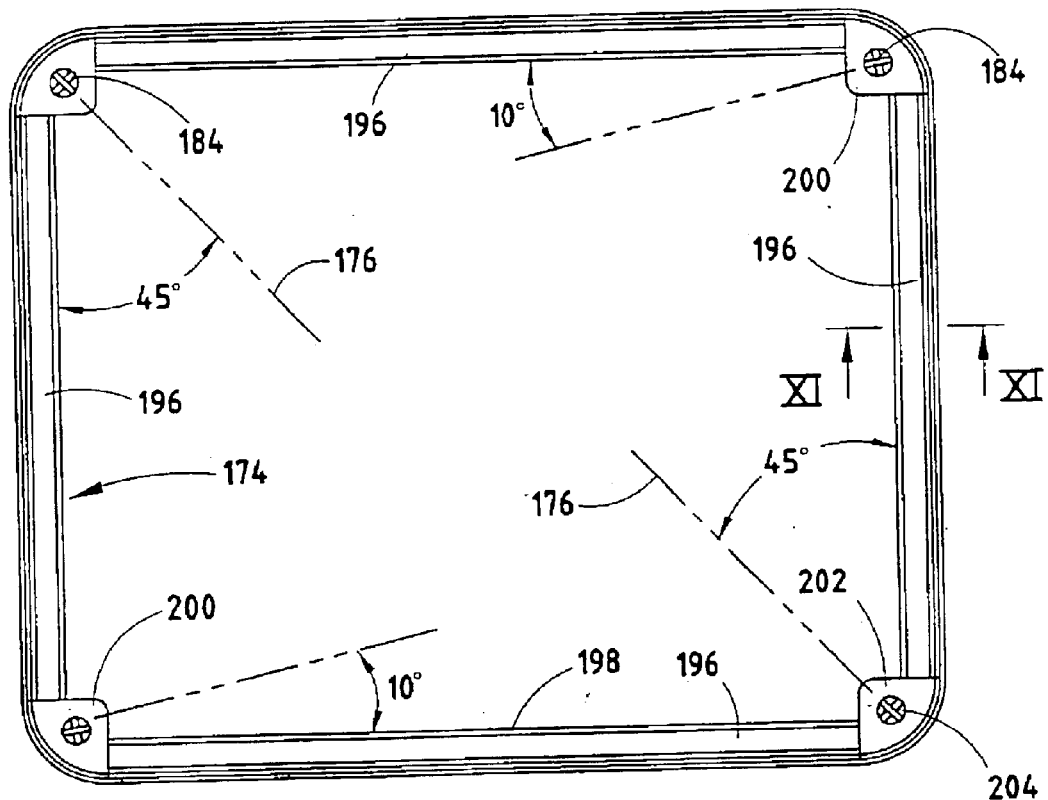
FIG. 10 is a plan view of the container rim.
Figure 11:
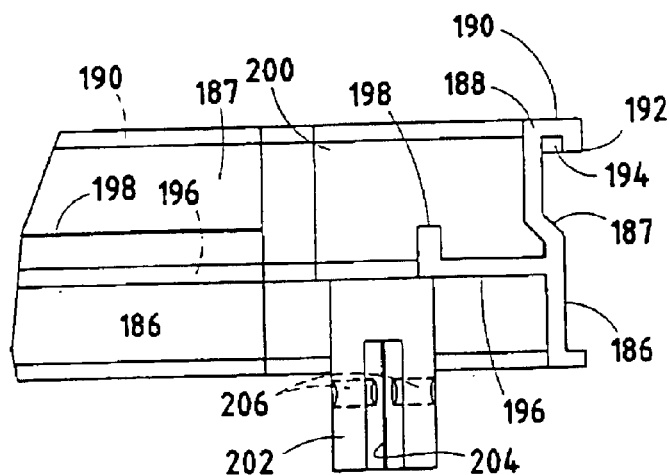
FIG. 11 is a fragmentary cross-sectional view of the container rim taken along the line XIX—XIX shown in FIG. 10.

Referring to FIGS. 1, 3 and 7, the termini or clevis ends 94 of the lower, intermediate, and upper spiders are vertically aligned and interconnected by file support assemblies 28. Support assemblies 28 support the outer ends 94 of the spiders 60, 64, and 67 and provide a structure from which drawers, trays or boxes are suspended. In addition, file support assemblies 28 provide a unified support for rotating spiders 60, 64 and 67 about the central support assembly 24. File support assemblies 28 includes at least one file support tube 110 having a concentric longitudinal passage extending entirely therethrough between ends 112 and 114. Received in each end 112, 114 of the file support tube 110 is a bushing 116. Each bushing 116 includes a cylindrical sleeve portion 118 having a outside diameter substantially equal to the inside diameter of the end 112, 114 and is prevented from sliding entirely into the support tube 110 by a shoulder 120 which abuts against the end 112 or 114. The peripheral edge of the shoulder 120 is defined by a wall 122 which transitions downwardly into a quarter-round annular groove 124 before terminating at the end 126. Extending between end 126 and the opposite 128 is a concentric longitudinal passage 130 having a threaded interior wall 132. Each file support tube 110 is disposed vertically between the clevis ends 94 of the adjacent spiders. The quarter-round concentric annular groove 124 in each bushing 116 is dimensioned to nest in the clevis end or termini 94 of each arm 92.

In the case of the lower spider 60, the bushing 116 at the lower end 114 of the tube 110 is retained by a bearing support member 134 which includes an outer diameter (O.D.) nipple 136 threaded configured to pass through the clevis end 94 and into the threaded interior wall 132 of bushing 116. Extending from the lower portion of the nipple 136 is a shoulder 138 of a dimension equal to end 126 extending between the passage 130 and the edge of the quarter-round annular groove 124 and configured to abut against end 126. Between shoulder 138 and the outer wall 142 of the bushing is a quarter-round annular groove 140 complimentary to that in the bushing 116 and configured to engage the opposite surface of the clevis end 94. The two grooves 124 and 140 then provide a bearing surface for the clevis end 94. The end of the bearing support member 134 may include a shallow recess 146 which defines a circular or annular bearing surface to engage bearing surface 54 or the bottom side of the top 26 to provide support. The bearing surface also permits rotation of support tube 110 relative to the rim 32 or the work surface/top 26. In one embodiment, the bearing support member 134 may be injection molded or fabricated from a self-lubricating polymeric material such as DELRIN® or similar material.

A connection similar to that just described is used to interconnect the upper file support tube 110A to the clevis ends 94 at the termini of the arms 92 on the upper spider 67. Interconnecting the bushing 116 at the upper end of the lower file support tube 110 to the bushing at the lower end of the upper support tube 110A, is a O.D. threaded nipple 150. It should be noted that the distance between the upper spider 67, the intermediate spider 64, and the lower spider 60 may be varied, controlled principally by the length of the lower and upper tube assemblies, as well as the lower and upper file support tubes. For example, in the embodiment shown in FIG. 1, the lower tube assembly 62 as well as the lower file support tubes 110 may each have a height of approximately 12 inches while the height of the upper tube assembly 66 and the upper file support tubes 110A may have a height of approximately 10 inches. In this configuration, drawers or containers of different heights may be hung at different levels to suit particular needs.

In FIGS. 1 and 3, each of the file support tubes 110 and 110A include a hanger arm assembly 152 defined by an upper arm 154 extending radially outward from a point proximate end 112 for a predetermined distance. A brace arm 156 is provided interconnecting a point proximate lower end 114 to the outermost end of the upper arm 154. A portion 158 of the upper edge 160 of the upper arm 154 is offset from the plane of the arm 154 to provide a lip for engaging a channel or flange of a container suspended thereon. The container is maintained in the upright position by lower bracket or brace 156. A preferred container design is contemplated and described in greater detail below.

A contemplated container for use in association with the cabinet embodying this invention is shown in FIGS. 8–11, and is particularly suited for suspending hanging files such as available under the PENDAFLEX™ brand name, In one form, a collapsible container 170 includes a bottom panel 172 suspended from a file hanger or rim 174 by a plurality of metal straps 176. The bottom panel 172 may have a generally rectangular perimeter 178 wherein opposite ends or sides of the panel are interconnected by a plurality of orthangonally interconnected ribs 180. At the corners of the perimeter 178, holes 182 are provided extending through the web and are adapted to receive the ends of the metal straps 176 therethrough. Cross pins 184 at the ends of the straps 176 provide a suspension point.

As in the bottom panel, the upper rim 174 (FIGS. 10 and 11) includes an outer perimeter wall 186 which includes an upper portion offset or staggered inwardly from that of the lower portion. The upper end 188 of the wall 186 further includes an outwardly extending flange 190 terminating in a downward extending lip 192 to define a channel 194. Extending inwardly midway up from wall 186 is a horizontally disposed flange 196 terminating in an upwardly extending lip 198. This structure extends substantially around the entire inner perimeter of the wall 186 to define a channel or race for receiving the ends of hanging files such as the PENDAFLEX™ brand files mentioned above.

In the corner of each rim 174 and interconnecting the adjacent ends of the inner flanges 196 are platforms 200 which extend inwardly midway up along the wall 186. As shown generally in FIG. 10, each platform 200 is generally a right triangle in plan form wherein the hypotenuse conforms to the curvature of the perimeter wall 186. Depending downwardly from a central location of the platform 200 is a generally cylindrical member 202. The cylindrical member 202 is split longitudinally to provide a generally rectangular longitudinal passage or slot 204 configured to receive the metal hanging straps 186 therein. Proximate the upper end of the cylindrical member 202 and transverse to the rectangular longitudinal passage are slots 206 on opposite sides of the passage 204, each configured to receive on end of a pin 184 extending transversely through the metal hanging strap 176. In this fashion, the hanging strap 176 is permitted to swing through an arc of 90° from the vertical upwardly inward toward the interior portion of the rim so that each strap can be folded generally parallel to the plane containing the rim of the container 170. In one embodiment, the angular orientation of each metal strap with respect to a longitudinal side of the rim may be the same in opposite corners. For example, in the embodiment shown in FIG. 10, the straps in the upper left and lower right corners are oriented at approximately 45° where the straps on the lower left and upper right corners have an approximate 10° deflection. This permits the hanging members to fold in the same plane without overlapping each other. It should be noted at this point that the bottom panel 172 is configured to nest within the lower portion of the rim 174 below the inner flange 196. Additionally, the circular holes 182 formed at the corners of the bottom panel 172 have a diameter just slightly larger than the diameter of the cylindrical members 202 depending from the platforms 200 of the rim 174. It is contemplated that the bottom panel 172 may slide vertically upward along each of the metal hanging straps 176 and nest in the bottom of the rim 174 such that the cylindrical members 202 are received in the holes 182. The bottom panel is then above the pivot point of the metal hanging pin 184 in the cylindrical members 202 so that the metal hanging members 176 may be folded inwardly against the bottom panel.

In operation, (FIG. 8) the containers 170 are expanded by extending the metal hanging straps 176 to a vertical position and pushing the bottom platform 172 downward to its fullest extent. The containers are then hung on the upper arm 152 by placing the portion 158 of the upper arms 154 within the channel 194 at the upper outside edge of the containers 170. While support assemblies 28 may be rotated inward to place the containers under the top assembly 26, the inward rotation of the file support assembly 28 is halted by a flange such as flange 100 extending upward from lower spider 60, flange 110A extending from intermediate spider 64 and flange 110B extending downwardly from the upper spider 67. The entire file assembly and spiders may be rotated by pushing on the file support assemblies 28 around the central support.

In an alternate embodiment, it is contemplated that the central support structure resting on the base assembly 22 may be altered by suspending the central support assembly 24 from the top assembly 26. The bending moment produced by the weight of the files on the ends of the spiders may be supported by a circular track or channel suspended from the lower surface of the top assembly 26. The filing cabinet would then be supported at the edges of the top assembly by an adjacent structure such as adjoining tops, credenzas, desks and the like.

Another form of the instant invention is shown in FIGS. 12–34. In this different form, the invention is based on the same general principal of providing a central member which radially supports a plurality of file support assemblies, each capable of suspending a file container therefrom, and swing about a vertical axis to move the file containers between a stored position close to the central member and a second position extending out away from the center post. Referring to the drawing figures, cabinet assembly 220 includes a base assembly 222 supporting a central support assembly 224, a top assembly 226, and a plurality of radially disposed file support assemblies, generally referenced as 228. Base assembly 222 (FIGS. 12 and 15) preferably is formed from metal rod to provide an outer rim or track 232 interconnected to a concentric inner hub 230 by a plurality of radially arranged spokes 234 such that hub 230 and rim 232 are supported above a reference plane (RP) such as defined by a floor. In the preferred form of the invention, rim 232 is made from a single length of rod, with the opposite ends welded together at a junction with one of the supporting spokes. The spokes and hub are also coupled together by welds. The hub 230 is preferably formed from a metal plate 235 having a plurality of radially spaced holes 236 disposed about a central opening 238, all extending through the thickness of the plate 235. Each hole 236 is configured to receive a respective end of one of the spokes 234, which is welded into place. Adjacent central opening 238, and disposed diametrically opposite each other are two mounting holes 240a, 240b to attach the central support assembly 224 described below.

Mounted to hub plate 235 and extending substantially perpendicular therefrom is the central support assembly 224. The central support assembly 224 is configured to support at least one, and preferably several tiers of files. However, the assembly may be reconfigured to support a single tier and may be supplemented by repeating sequences to support multiple tiers. It is contemplated that up to four or more tiers may be supported by the central support assembly 224. Central support assembly 224 may be tubular in construction to provide a chase for passing cabling or wires down through the hub plate. Referring to FIGS. 12–19, central support assembly 224 includes a tubular threaded nipple 242 at a lower end configured to mate with the hub plate 235, and a lower spider 244, at least one tube assembly 246, an upper spider 248, and a top assembly 250. In the two tier embodiment shown in FIG. 12, an intermediate spider 252 is shown, disposed between the lower tube assembly 246 and a second or upper tube assembly 254. Threaded nipple 242 is preferably made from plastic although aluminum or steel may also be used. A lower end 256 includes a central passage 261, two diametrically opposed pins 258 on opposite sides of passage 261 and configured to be received by mounting holes 240A and 240B in the hub plate 235. The lower end of nipple 242 is defined by a flange portion 260 which transitions over a chamfered shoulder 262 to a threaded body 264 until terminating at upper end 266.

Received over threaded end 266 of nipple 242 is the lower tube assembly 246 (FIG. 17). As briefly mentioned above, in the event a single tier configuration is desired, only a single tube assembly 246 may be used. However, if a multi-tiered structure is preferred, multiple tube assemblies may be stacked to increase the height and support the structure of the cabinet. Both embodiments will be described herein. In the instance of a single tier structure, tube assembly 246 includes a bushing 268 at a lower end, a tubular body 270, and a second bushing 272 at an opposite end. Bushings 268 and 272 are substantially identical in appearance and include a tubular central passage 274, an outer wall 276 dimensioned to be slidably received inside each end of tubular body 270, and a shoulder 278 configured to butt against the end of tubular body 270. From shoulder 278, the exterior is defined by a chamfered surface 280 which terminates in end 282. In the preferred embodiment, central passage 274 is threaded to mate with the threads 264 on the nipple 242 so that the chamfered surfaces may lie adjacent each other as in FIG. 17. To prevent tubular body 270 from spinning freely around outer wall 276 of each bushing 268, 272, a key 284 is defined on the exterior of wall 276 adapted to fit in a slot (not shown) formed in the end wall of tubular body 270.

Figure 18:
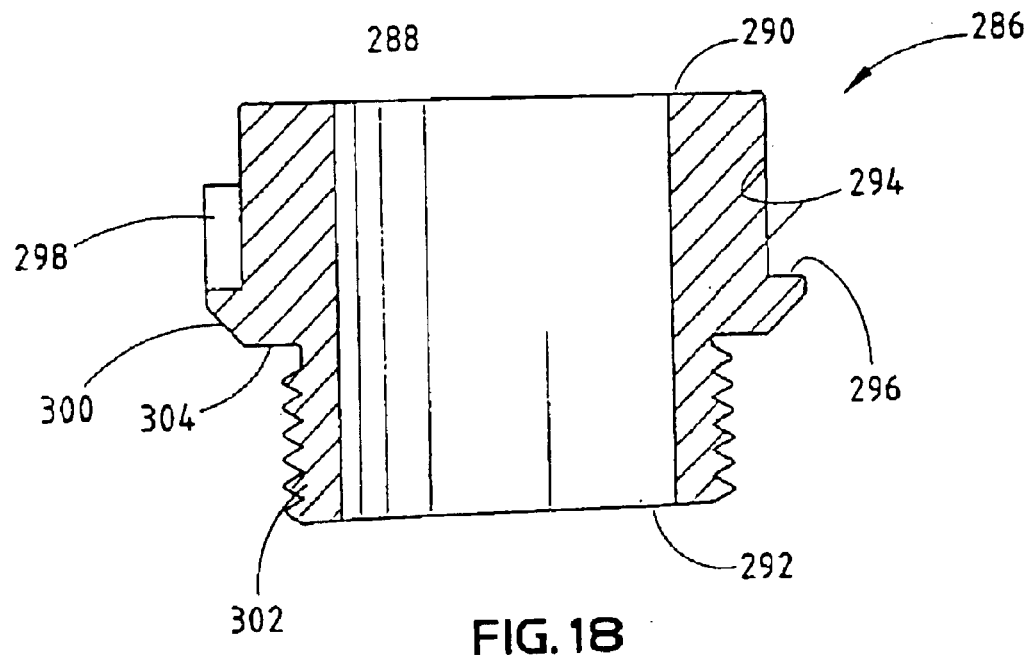
FIG. 18 is an elevation cross section of a coupling for two tubular bodies of the central support assembly.
Figure 19:
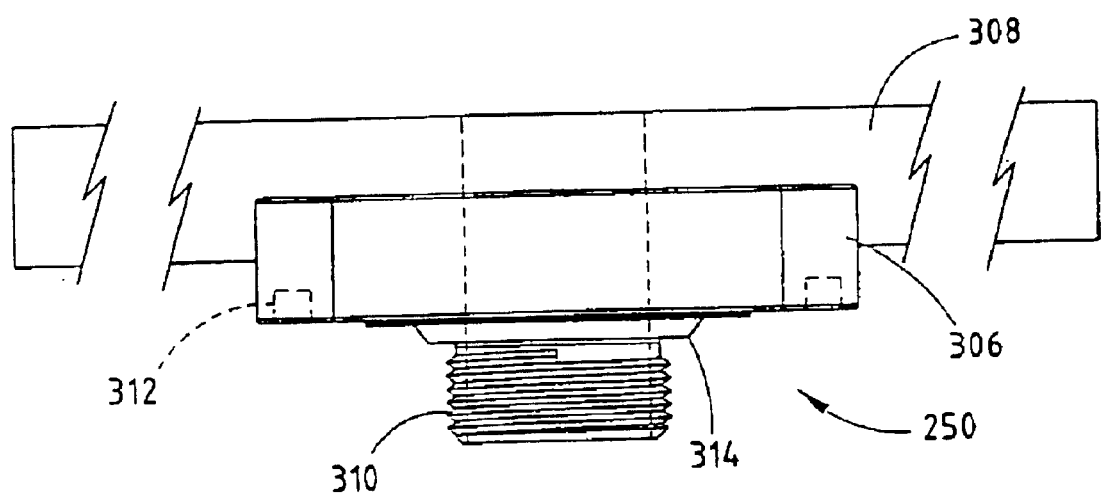
FIG. 19 is a fragmentary elevation view of the top assembly.

For multiple tier designs, bushing 272 at the upper end of tube 270 is connected by a male threaded bushing such as 286 shown in FIG. 18, where end 290 is received in the lower end of the overlying tube. To interconnect tube assemblies such as 246 and 254 shown in FIG. 12, the upper bushing 272 of the lower tube assembly 246, or alternatively, the lower bushing 268 of the upper tube assembly 254, may be replaced with a nipple connector such as 286. Connector 286 includes a tubular passage 288 extending from end 290 to end 292. The dimension of the outer wall 294 is such to just slide within the end of tubular body 270 until the shoulder 296 butts against the end of the tube. A key 298 is defined in wall 294 to be received in a slot (not shown) in the respective tube assembly to fix the relative rotational positions of the bushing and the tube. From shoulder 296 to end 292, a chamfer 300 is provided before changing to a threaded male member 302. The threads of the mating member 302 mate with the female threads of passage 274 to place the end 282 of the bushing adjacent the end 304 of the chamfer. In either of the single or multiple tier designs, the upper end of the last tube assembly preferably contains a bushing substantially similar to bushing 268 and 272. The top assembly 250 includes a flange 306 connected to a top or work surface 308 of the cabinet using conventional fasteners. A threaded nipple 310 extends from one side 312 to mate with the upper bushing such as 268 or 272 (FIG. 19). A chamfer 314 similar to those described earlier is defined extending from side 312 to transition to nipple 310 for reasons described below.

Figure 20:
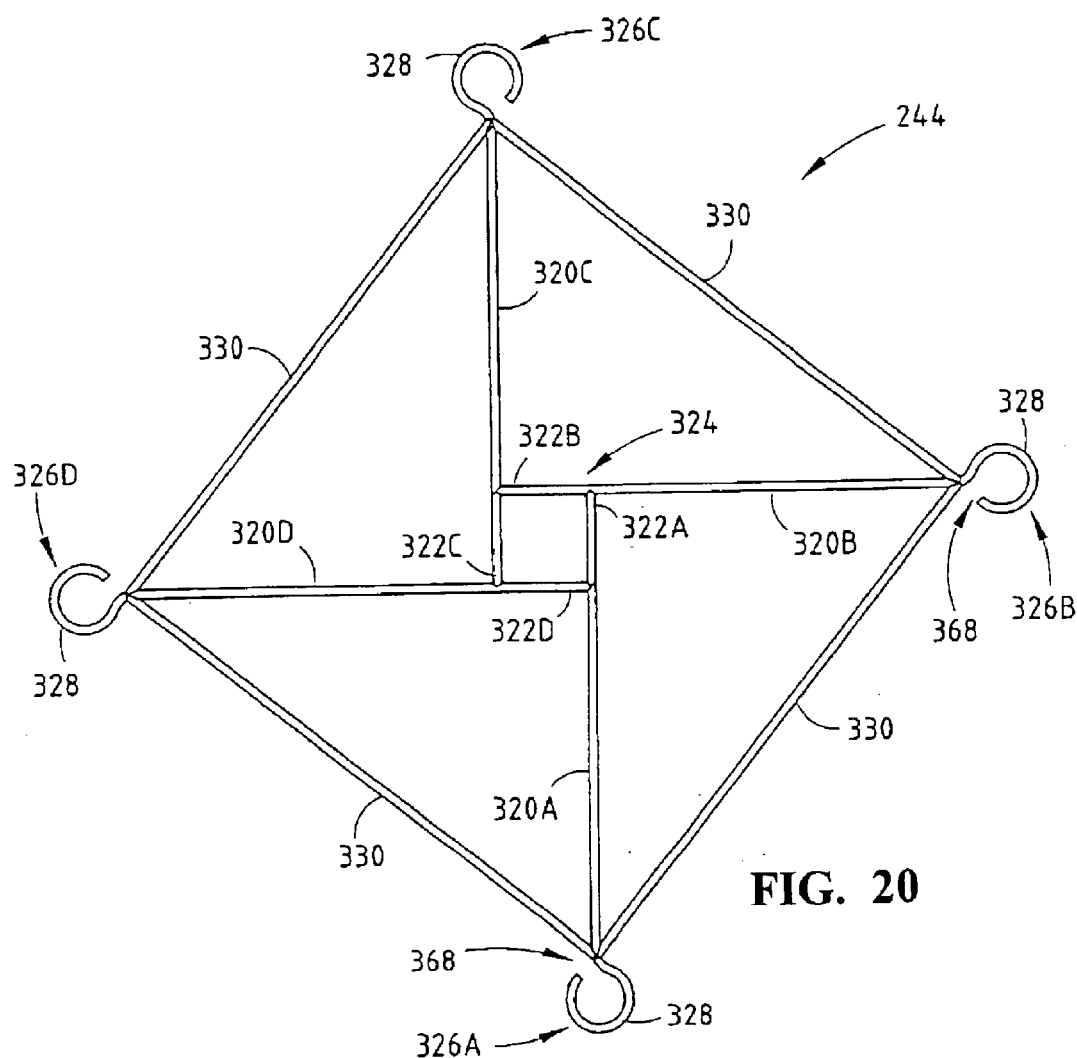
FIG. 20 is a plan view of a spider.

As briefly mentioned above, and depending upon the number of tiers cabinet 220 is configured to provide, spiders are mounted to the central support assembly. In the case of a single tier file cabinet, lower and upper spiders 244 and 248 are used. If multiple tiers are configured, intermediate spiders such as 252 are also used. No matter what configuration, it is contemplated that all spiders may be substantially identical in configuration such as shown in FIG. 20. Each spider 244 includes a plurality of radially disposed arms such as 320A, 320B, 320C, and 320D, each having one end 322A, 322B, 322C, and 322D attached to the angularly adjacent arm to define a polygonal-shaped core or ring 324. The opposite ends 326A, 326B, 326C, and 326D terminate in a clevis 328. Angular brace members 330 interconnect angularly adjacent arms 320 at points proximate the base of each clevis 328. In one form of the invention, each spider such as 244, 248 or 252, is made from three-eighths inch cold rolled bar steel. The lower, upper and any intermediate spiders 246, 248 or 252 are mounted along the central support assembly 224 such that the polygonal ring 324 is captured between the chamfers of the bushings and the respective opposing nipple or coupler (for example 262 and 280; 280 and 300; and 280 and 314). The polygonal ring 324 is dimensioned such that a central portion of each arm is in contact with the opposing chamfered surfaces and permit each spider to spin, pivot or rotate around the vertical axis defined by the central support assembly 224. Note that only the portion of each arm 320 tangential to the chamfered face makes contact for the bearing point. It is believed that friction is substantially reduced in this manner to provide easy rotation of each spider.

In one form of the invention, the termini or clevis ends 328 of the different spiders (244, 248 and optionally 252) are vertically aligned and interconnected by the file support assemblies 228. As in the previous embodiment, the file support assemblies 228 support the outer ends 328 of the spider arms and provide a structure from which drawers, boxes, crates or trays are suspended. In addition, the file support assemblies interconnecting the different spider arms provide a means for uniformly rotating the one or more tiers. In the embodiment shown in FIG. 12, all tiers are interconnected so rotation of one tier causes rotation of the others. It is contemplated that additional spider arms or spiders may be incorporated so that each tier rotates independently of the others.

Figure 24:
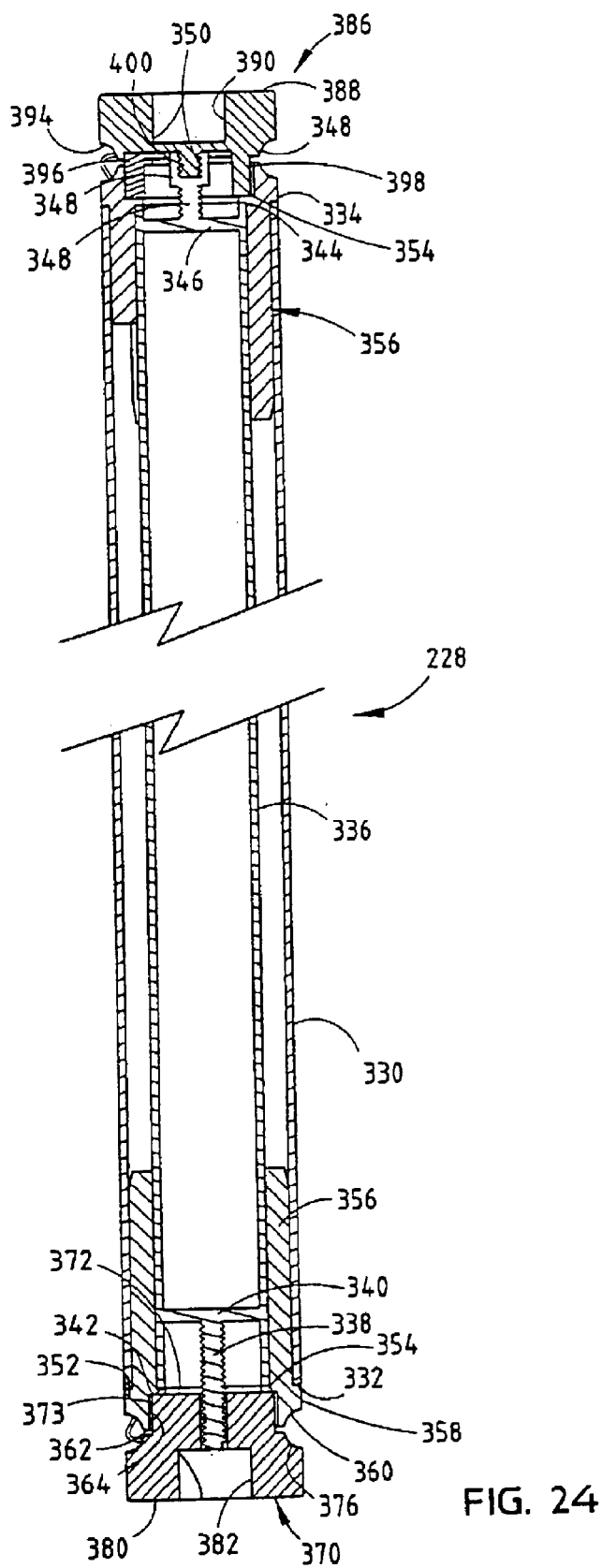
FIG. 24 is an fragmentary elevation cross section view of the file support assembly taken along line XXIV—XXIV shown in FIG. 22.
Figure 25:
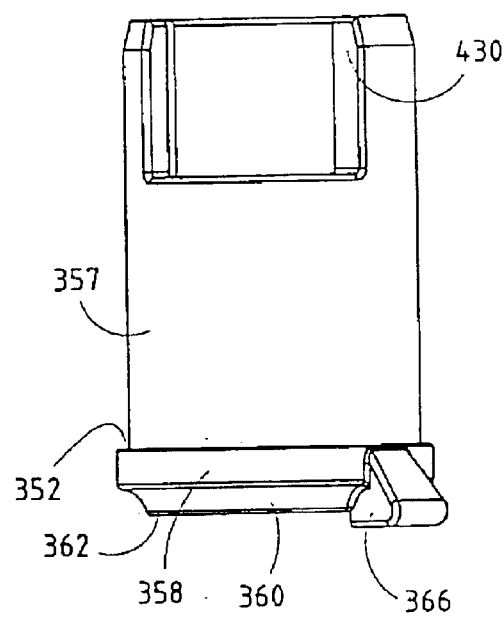
FIG. 25 is an elevation view of a file tube bushing used in a file support assembly.
Figure 27:
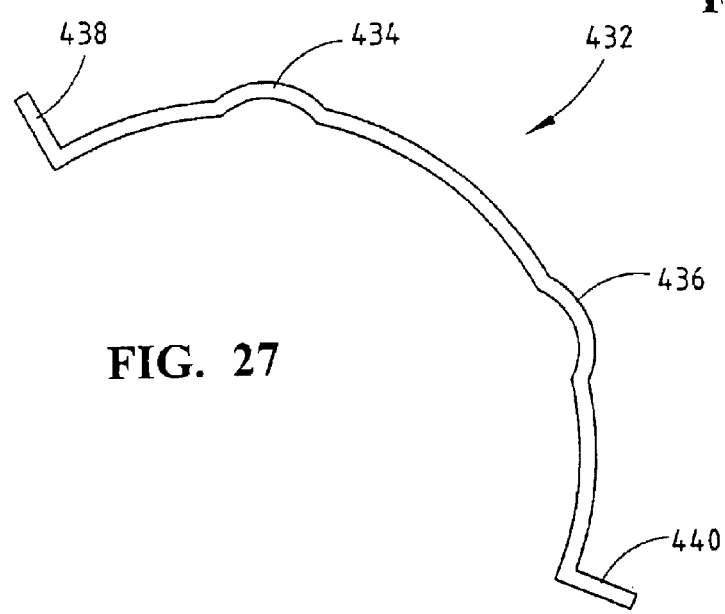
FIG. 27 is a plan view of the spring shown in FIG. 26.
Figure 28:
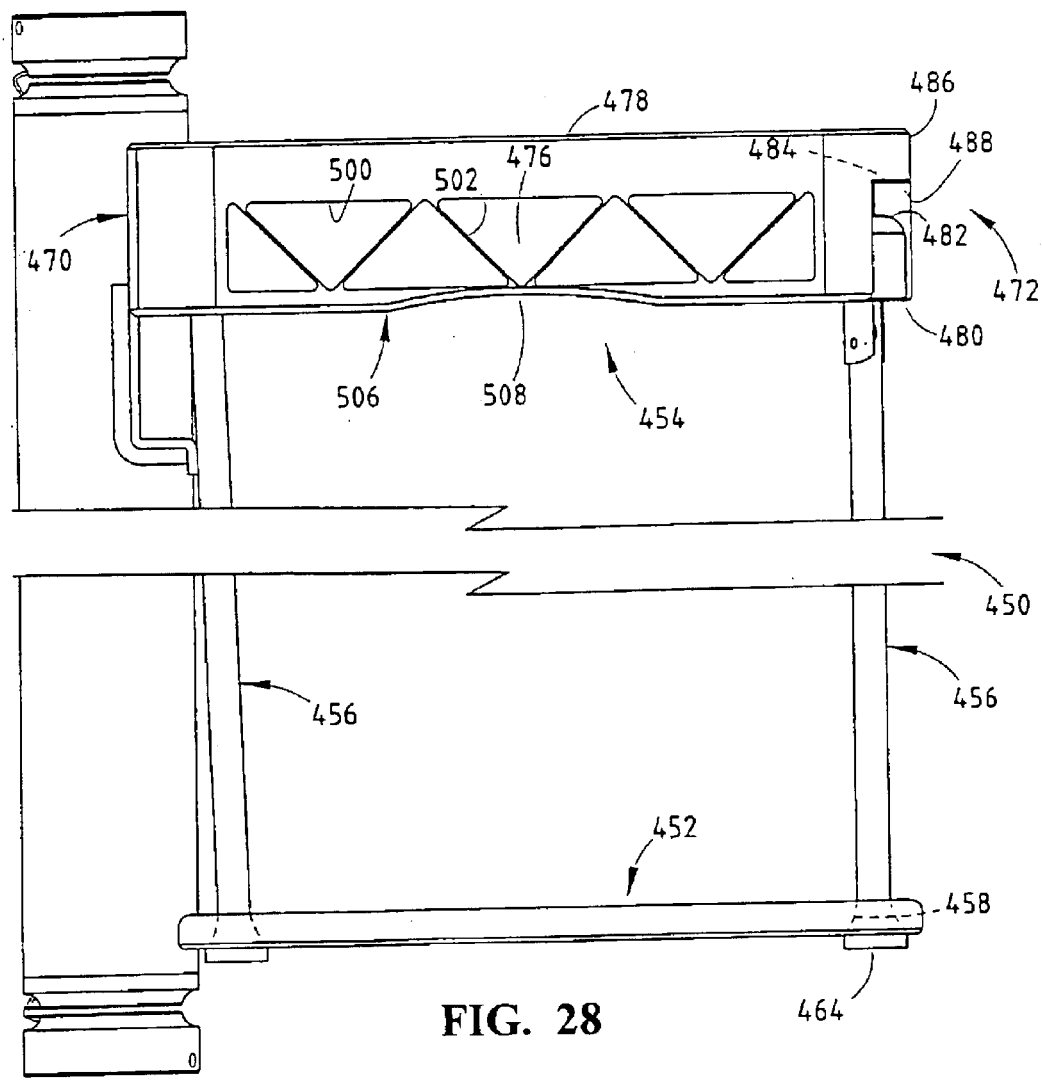
FIG. 28 is a side elevation view of one embodiment of a container suspended on the file support assembly shown in FIG. 23.
Figure 29:
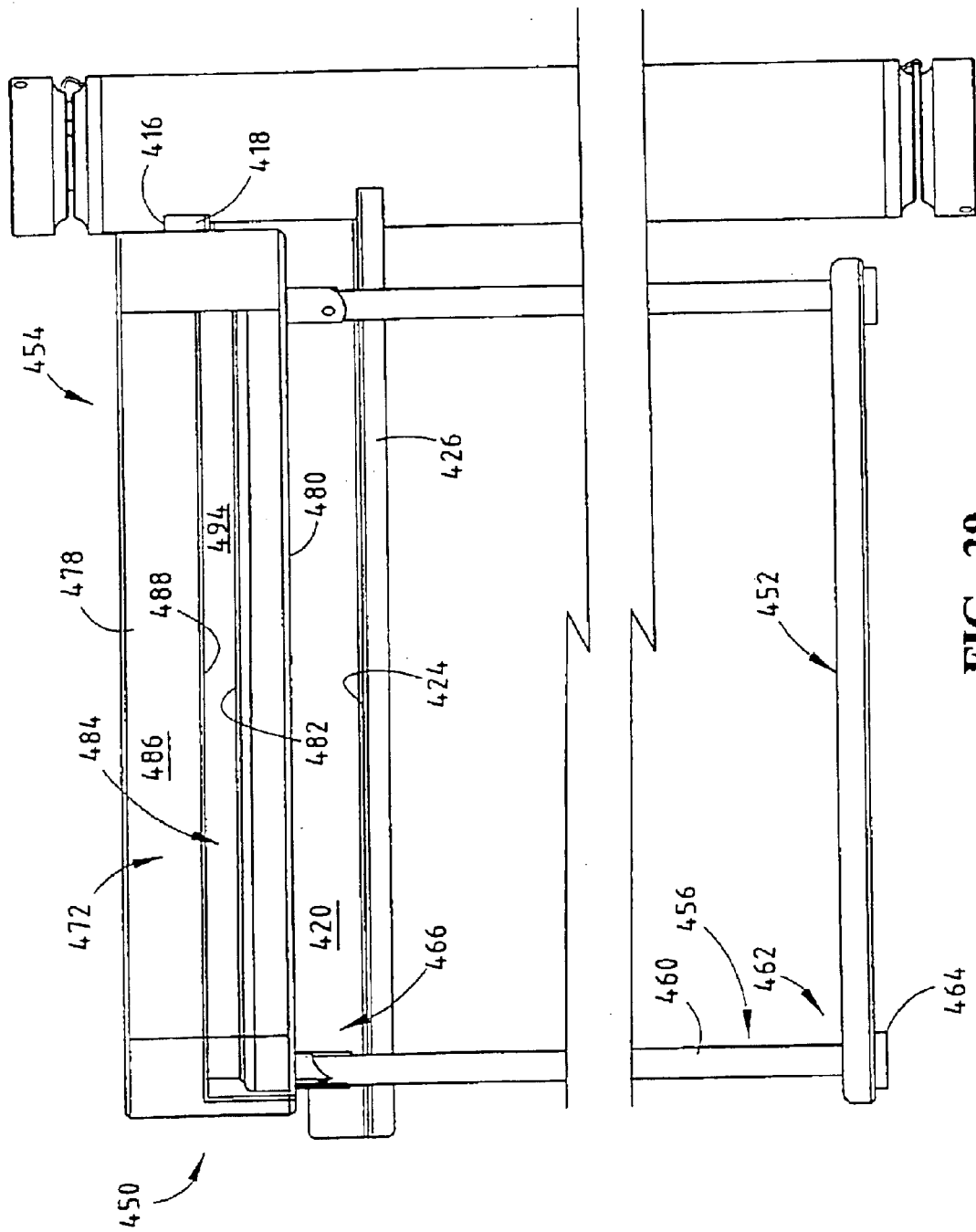
FIG. 29 is a front elevation view of the container shown in FIG. 28 and suspended on the file support assembly.

Referring to FIGS. 21–24, each file support assembly 228 includes a file support tube 330 having a concentric tubular passage extending entirely therethrough between ends 332 and 334 (See FIG. 24). Disposed axially within support tube 330 is an inner support tube 336 (FIG. 24), having an axially disposed threaded bolt 338 extending from an end plate 340 recessed within one end 342 of the inner support 336. At the opposite end 344, an end plate 346 is recessed in the inner support tube 336 and supports a sleeve 348 threaded on the interior wall 350. The inner support tube 336 is centered within the file support tube 330 by a pair of file support bushings 356, each received in an opposing end 332, 334 of file support tube 336. An exterior shoulder 352 of each bushing butts against the ends 332, 334 of tube 330 while an inner shoulder or flange 354 butts against the ends 342, 344 of the inner tube 336. Each bushing 356 (FIGS. 25–26) includes a cylindrical sleeve portion 357 having an outside diameter just slightly less than the inside diameter of tube 330, and includes an inside diameter just slightly larger that the outside diameter of tube 336 to provide a snug fit, but not tight enough to prevent rotation of tube 330 about sleeve 356 for reasons which will become apparent below. The peripheral edge of the exterior shoulder 352 is defined by a wall 358 which transitions to a quarter-round annular groove 360 prior to terminating at end 362. Defined concentrically within the end 362 is a cylindrical recess 364 which terminates at the flange 354 described earlier. The inside diameter of the inner shoulder or flange 354 is sufficient to permit bolts 338 or sleeve 348 to extend therethrough and out beyond the end 362. As best shown in FIG. 25, each bushing 350 includes a projection or knob 366 which extends from the outer wall 358 and quarter-round annular groove 360 for purposes of locating the end 362 of each bushing properly within the clevis end 328 of the spider arms 244, 248, or 252. The knob 366 fits in the gap 368 (FIG. 20) of each clevis 328 to prevent each bushing from rotating relative to each spider arm or with respect to the file support tubes 330.

Figure 12:
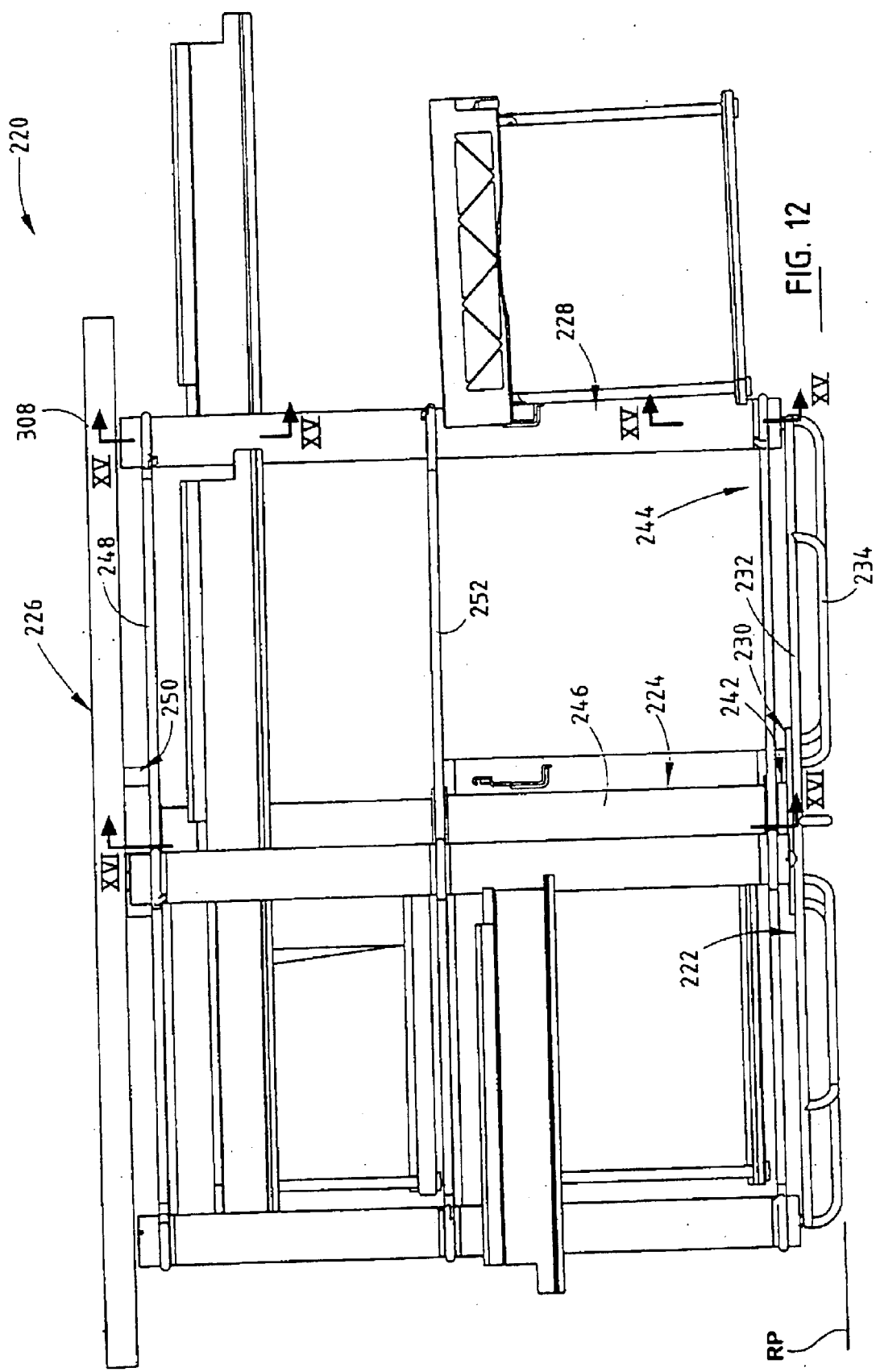
FIG. 12 is an elevation view of an alternate embodiment of the instant invention.
Figure 13:
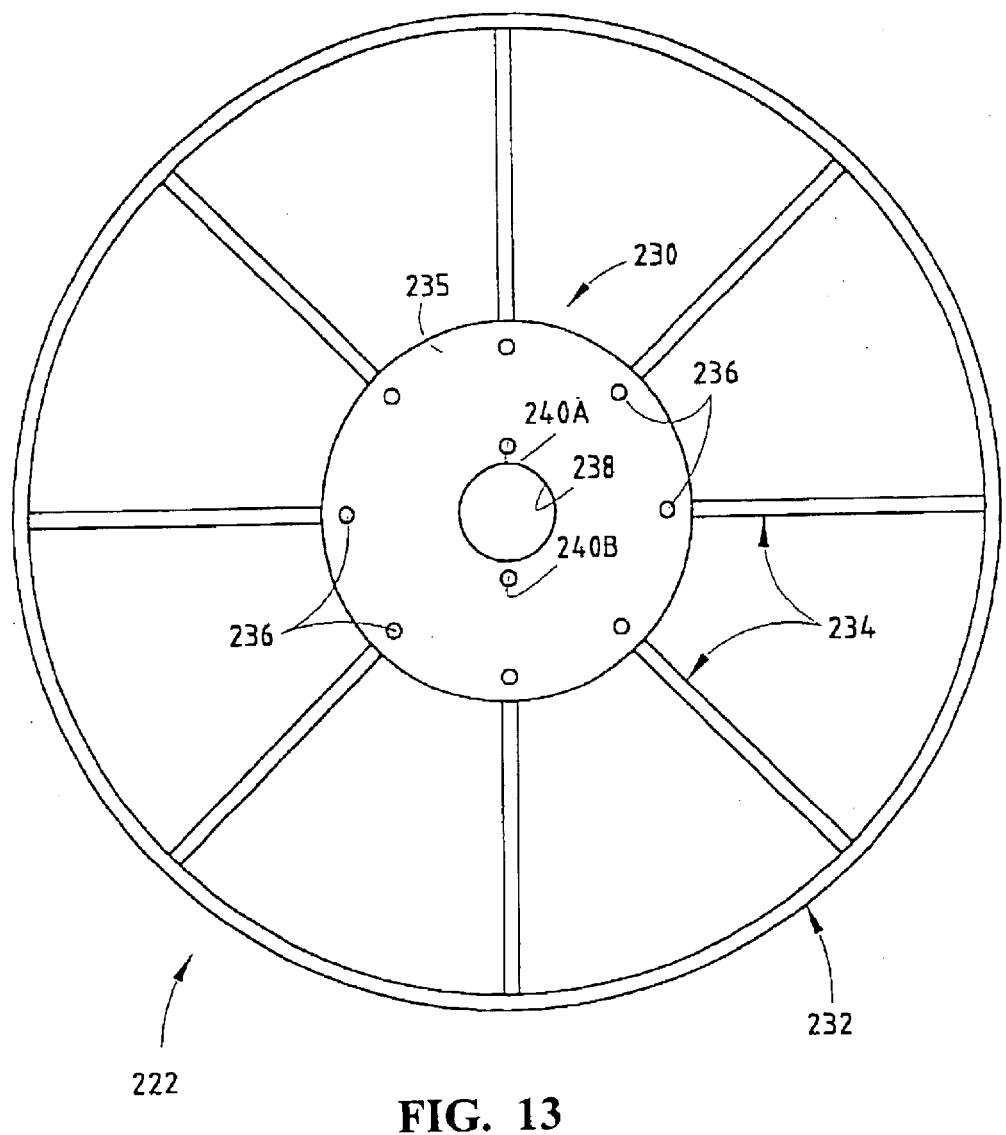
FIG. 13 is a plan view of the base assembly.

Referring to FIGS. 12 and 24, each file support assembly 228 is disposed vertically between the clevis ends 328 of the adjacent spiders. The quarter-round concentric annular groove 360 in each bushing 356 is dimensioned to receive and nest with the clevis end 328 of each arm 320. In the case of the lower spider 244, the bushing 356 at the lower end of tube 330 is retained by a bottom wheel support 370 having a first end 372, and an axial threaded passage 374 configured to receive bolts 338. The outer diameter or wall 373 proximate end 372 is dimensioned to be received within a cylindrical recess 364 such that upon tightening of the bottom wheel support 370 along the bolt 338, the end 372 butts against the inner shoulder or flange 354 of the bushing 356, clamping it in place against the end 342 of the inner support tube 336. It is preferred tolerances are such that clamping of the shoulder or flange 354 against the end 342 of the inner tube 336 does not force the outer shoulder 352 against the end 332 of tube 330 to prevent tube 330 from rotating about the bushing 356. However, it is preferred that tolerances are close enough to prevent tube 330 from moving axially along bushing 356. Intermediate the exterior of the bottom wheel support 370, the inner wall 373 transitions outwardly to form a cooperating quarter-round groove 376 which complements quarter-round annular groove 360. Again the dimension of the quarter-round annular groove 376 is such as to be received within and nest against the clevis end 328. Extending inwardly from end 380 is a recess 382 configured to receive and mount a wheel or roller (not shown) shaped specifically to ride along the outer rim or track 232 of the base assembly 222.

The upper end of the file support assembly 228 shown in FIG. 24 is mounted with a similar wheel or roller support assembly 386 in the event a single tier structure is elected. In addition, the upper support, assembly 386 is designed to be used at the uppermost tier of a series of stacked file support assemblies 228. The upper support assembly 386 includes an upper end 388 which contains a recess 390 adapted to partially receive and mount a wheel or roller (not shown) having a more conventional shape and configured to run on the under side of the work surface 308. A quarter-round annular groove 394 is defined in an exterior wall intermediate ends 388 and 396 and configured to nest with the clevis end 328 described above. An annular right circular cylindrical wall 398 defines end 396 and is inset from the quarter-round annular groove 394 and dimensioned to be received in the cylindrical recess 364 in the end of the bushing 356. Concentric within the right circular cylinder annular wall 398 is a threaded bolt 400 adapted to thread with the cylindrical sleeve 348. The end 296 of the circular wall 398 is dimensioned to butt up against the shoulder of flange 354 and urge it against the end 344 of the inner tube 336. In instances where two or more files support assemblies 228 are interconnected in a multi-tier arrangement, the upper support 386 is removed, and the upper file support assembly 228 is held in place by a bolt similar to 338 extending from the lower bushing of the upper file support such as shown in the lower portion of FIG. 24. The bolt is received in the threaded sleeve 348.

Figure 21:
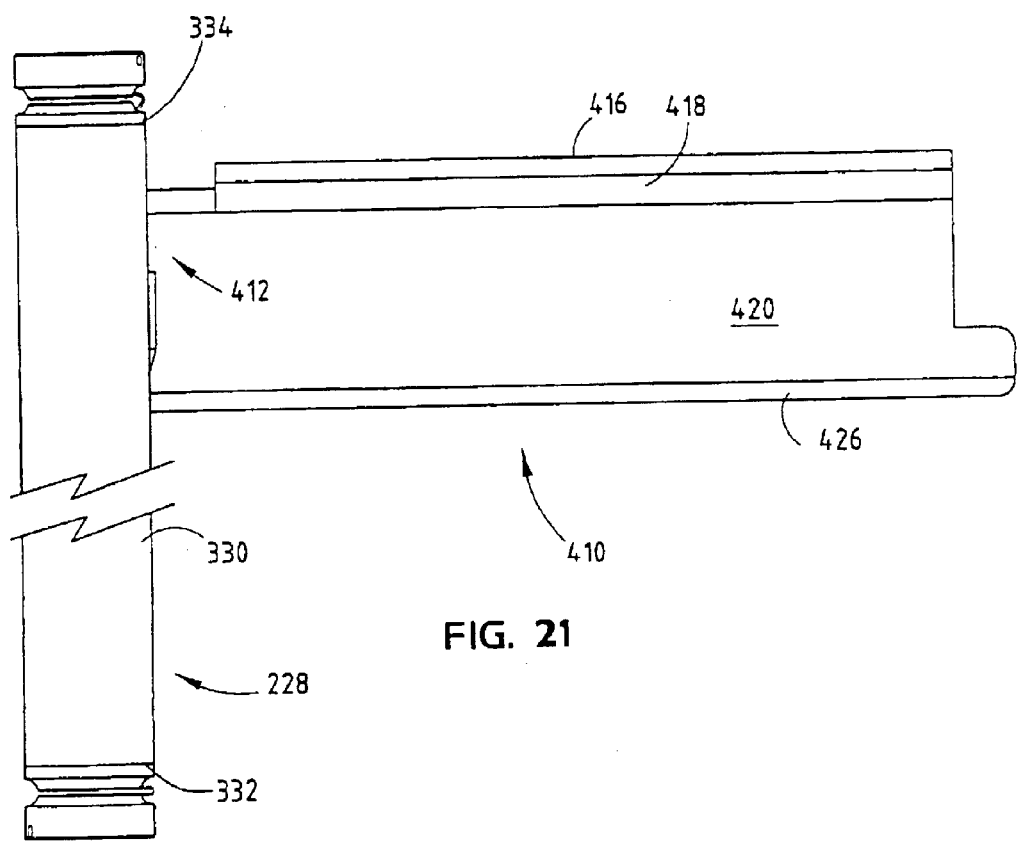
FIG. 21 is a front elevation view of a file support assembly.
Figure 22:
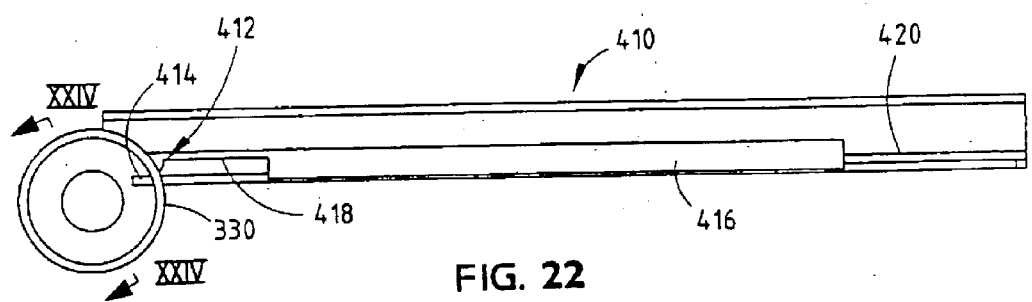
FIG. 22 is a top plan view of the file support assembly shown in FIG. 21.
Figure 23:
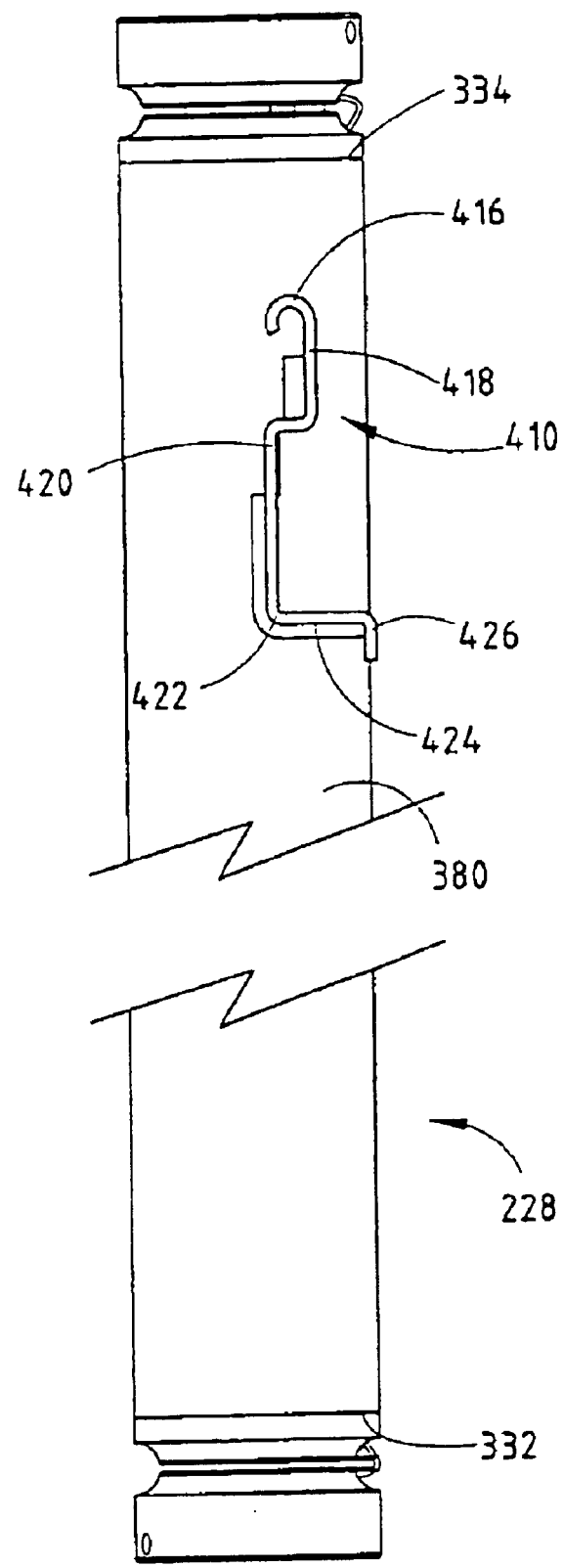
FIG. 23 is a fragmentary side elevation view of file support assembly 228 shown in FIG. 21.

Referring to FIGS. 12 and 21–23, cantilevered from each of the file support tubes 330 is a hanger or pivot arm 410. One end 412 of the hanger arm is welded to tube 330 proximate upper end 334 and includes a flange 414 (FIG. 22) which extends through tube 330 and partially into the tubular interior for reasons which will be described below. The hanger arm 410 extending from arm 330 does not extend radially therefrom, but rather is oriented substantially tangentially to the curved surface forming the exterior of the tube 330. As seen best in FIG. 23, the hanger arm 410 includes a generally inverted U-shaped upper edge 416 wherein one leg 418 of the U continues downwardly a predetermined distance before jogging at a substantially right angle to the left to form a greater downwardly depending wall 420. Proximate a lower end of wall 420, the hanger is offset to the right to produce a generally horizontal portion 424 which terminates in a vertical portion 426 which extends to the right beyond the profile of the tube 330. The flange portion 414 (FIG. 22) extending partially into tube 330 extends from wall 418. The lower portion of lower wall 420, bend 422, and lower flange 426 are welded to the exterior of the tube 330 while at the same time the flange 424 terminus 426 wraps around a portion of the circumference of tube 330 to provide rigidity and support to the arm 410. The upper inverted U-shaped portion of edge 416 is configured to be received in a slot in the exterior edge of a container described below and as a result, may have a predetermined length as shown in FIG. 21. The horizontal flange 424 and the terminus 426 may have a greater dimension than that of the upper edge 416 for the purposes of supporting the lower portion of the container which depends on the upper edge 416 and to keep the file substantially vertical. The offset between the upper wall 418 and the terminus 426 is defined in substantial part by the relief of the side of the container between the hanging point, and the legs or sidewalls of the container.

Figure 26:
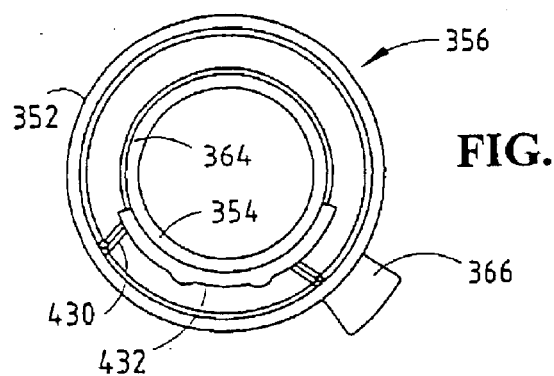
FIG. 26 is a top plan view of the file tube bushing shown in FIG. 25.

The rotation or arc of the hanger arm 410 about the axis defined by the upper and lower bushings 356 is determined in substantial part by the arc defining slot 430 formed in the bushing sleeve 357. With the bushing 356 inserted in the upper portion of the file support tube 330, the flange 414 extends through the file support tube 330 into the slot 430. Since the bushing 356 remains stationary as a result of the knob 366 in the gap the clevis, the flange 414 and the file support tube 330 pivot about the bushing 356. Refer to FIGS. 25 and 26. A spring 432 (shown in FIG. 27) is provided to be retained within the slot 430 and interact with the end of flange 414 to prevent the tube and hanger arm 410 from swinging freely once the file support assembly has been rotated outward. In order to achieve this, detents 434 and 436, defined by changes in radius of the spring 432, engage the end of the flange 414 and create resistance or friction on the end of the flange 414. The spring constant is sufficiently high such that the flange 414 does not easily ride over the detents 434 and 436 without assistance from the operator. The ends of the spring 438 and 440 are bent at substantially right angles to the curvature of the spring and are intended to be received in recesses formed in the interior of the bushing sleeve 356 to keep the spring within the arc subtended by the slot 430 and to keep the spring from being forced to the interior of the bushing when in use. The relative positions of the detents 434 and 436 along the length of the spring may be changed to provide the desired resistance that the appropriate locations.

Another form of the container 450 contemplated to be used in association with the incident invention is shown in FIGS. 28 through 34. In one form, it is contemplated that container 450 may be a collapsible container that includes a bottom panel 452 suspended from a rim 454 by a plurality of container legs 456. Bottom panel 452 is preferably rectangular in plan form and may be formed from a number of different materials although injection molded plastic is the preferred embodiment. At the corners of the bottom panel 452, holes 458 extend through the bottom panel and are adapted to slidably receive one of the container legs 456. In this form of the invention, each container leg 456 includes a generally cylindrical body 460 which may be straight, or slightly conical or tapered so that it increases in dimension toward its lower end 462 where it terminates in a "T" or flange 464 having a dimension substantially greater than the holes 458. The opposite end 466 of the body 460 is of a dimension less than that of each hole 458 and is attached to rim 454 in a manner described in greater detail below.

The upper rim 454 of the container 450 is generally rectangular in plan form (FIG. 30) and is preferably formed as a unitary component. The rectangular plan form of the rim 454 permits storage of letter and/or legal size documents. As seen in the drawing FIGS., the rim 454 includes two diametrically opposing side walls 470, 472 interconnected to diametrically opposing end walls 474 and 476. The exterior surfaces of the side walls 470, 472 (FIGS. 29–32) create an upper perimeter flange 478 which extends substantially around the entire rim 454. The rim also includes a lower perimeter flange 480 which also extends around substantially the entire portion of the rim 454. Intermediate the upper and lower flanges 478, 480, respectively, is an elongated channel 482 configured to receive the inverted U-shaped upper edge 416 of the hanger arm 410. A complimentary inverted U-shaped depression 484 is formed along the entire upper edge of the channel 482 and is set back from the outer wall 486 by flange 488. The inverted U-shaped depression 484 and the flange 488, together with channel 482 receive the upper edge 416 of the hanger arm 410 to suspend the rim 454, the depending container legs 456, and bottom panel 452 on the hangar arm 410. The length of the channel 482 closely corresponds to the length of the inverted U-shaped upper edge 416 and wall 418 to prevent the container from sliding along the arm 410. A similar channel structure is defined along the opposite side wall 470 so that either side of the container 450 may be hung from the hangar arm 410.

Figure 30:
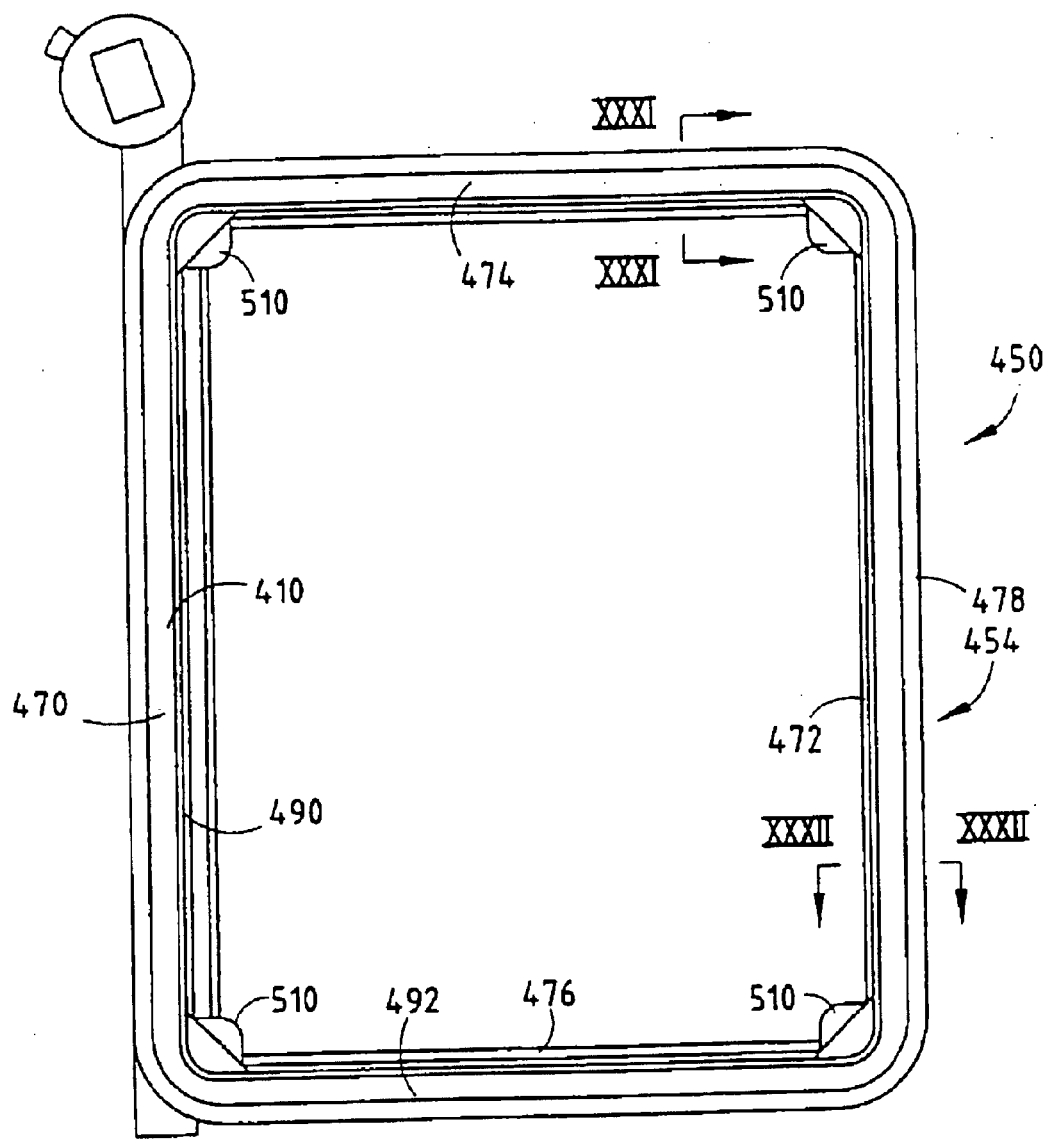
FIG. 30 is a plan view of the file support assembly and container shown in FIG. 28.
Figure 31:
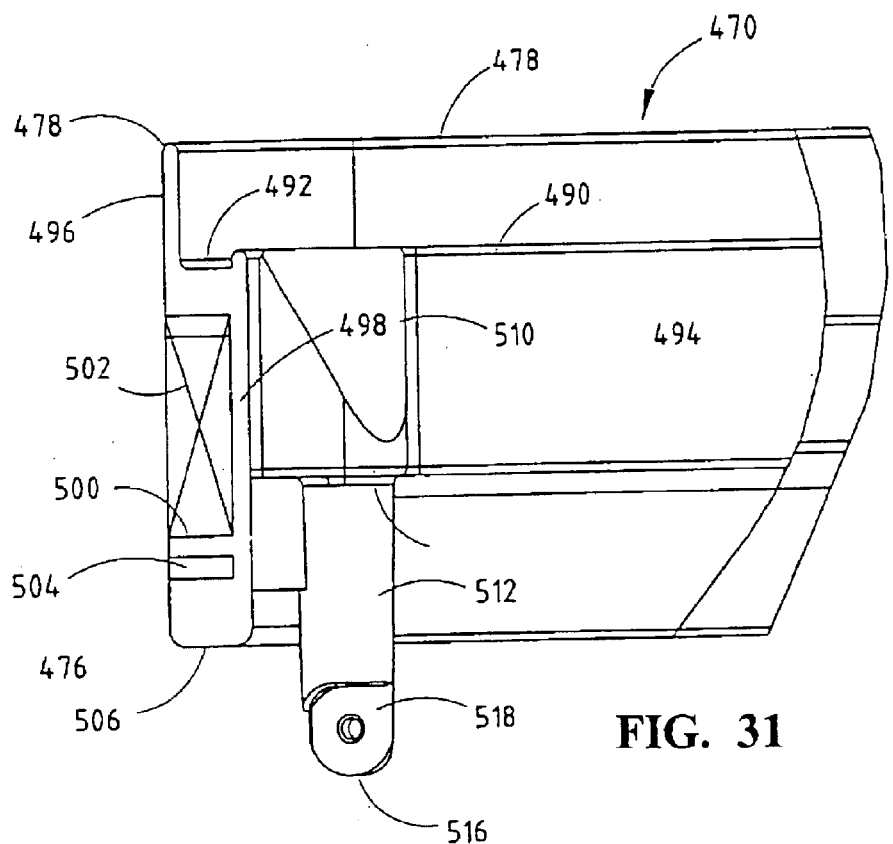
FIG. 31 is a fragmentary section view of the container shown in FIG. 30 and taken along line XXXI—XXXI.
Figure 32:
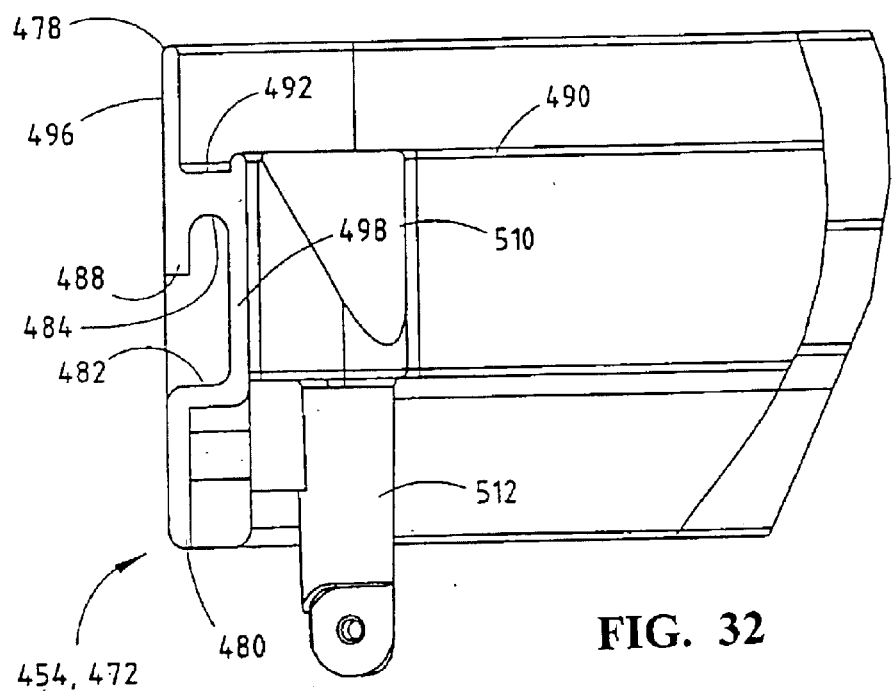
FIG. 32 is a fragmentary section view of the container shown in FIG. 30 and taken along line XXXII—XXXII.

Defined on the interior of the container rim 454 is an inner perimeter flange 490 which is separated from the upper perimeter flange 478 by a channel 492. With respect to the side walls 470, 472, the upper perimeter flange 490 is substantially above the wall 494 forming the innermost vertical wall of the channel 482. The inner perimeter flange 490 and channel 492 are intended to provide a structure for hanging file folders such as those available from PENDAFLEX™ or similar hanging files. The perimeter flange 490 and channel 492 extend substantially around the side walls 470, 472 as well as the end walls 474, 476 as best illustrated in FIGS. 30–32. The end walls 474 and 476 also include relief to provide structural rigidity as did channel 482 in the side walls 470 and 472. With respect to end wall 476 shown in FIG. 31, each end wall includes the upper perimeter flange 478 extending upwardly from channel 492 which separates inner perimeter flange 490 therefrom. Below channel 492 and defined in the outside wall 496 is an inset 498 to lie substantially below the inner perimeter rim 490. The channel or depression 500 formed by the offset is braced by a plurality of webs or bulkheads 502. The webbing 502 tends to strengthen the wall while channel 500 reduces the overall waste of material required to form the end walls 474 and 476. Additional relief or contouring of the wall such as shown by slot 504 may be provided to strengthen the end walls 474 and 476. To accommodate the user's hands and provide a gripping location for the rim 454, the lower edge 506 includes an arcuate hand grip 508.

Figure 33:
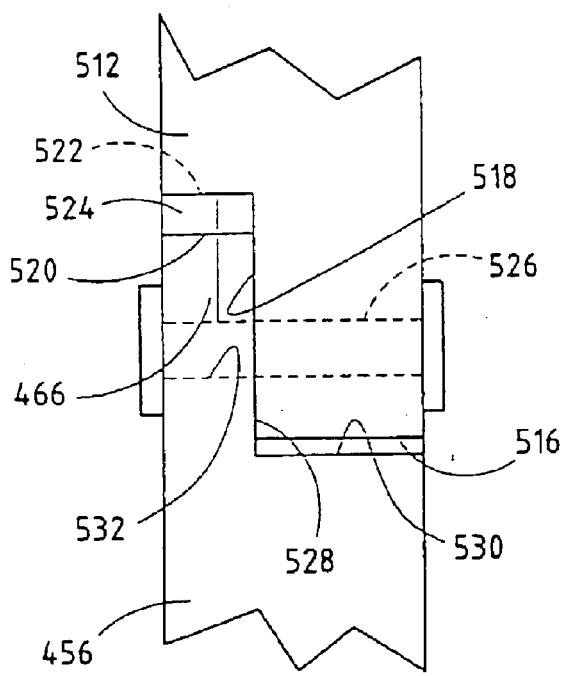
FIG. 33 is a fragmentary elevation view of a connection between a leg and the container rim.
Figure 34:
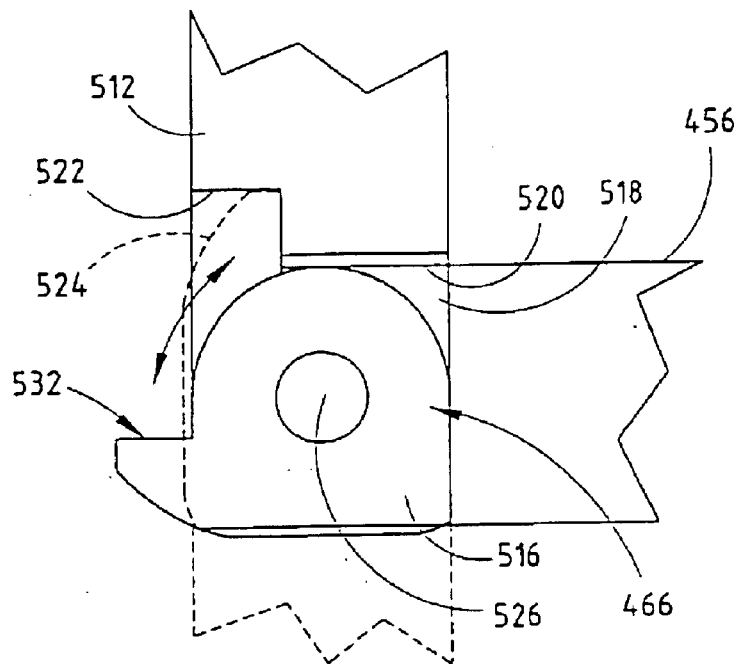
FIG. 34 is a fragmentary elevation view of the connection between the leg and the container rim at a right angle to the view shown in FIG. 33.

Defined in the interior corners of the rim 454, and extending inwardly from the junctures of the side walls 470, 472 with ends walls 474, 476 are truncated prism-shaped footings or pylons 510. Each footing or pylon 510 includes a downwardly depending column 512 extending from an underside 514. The lower end 516 of each column is adapted to be pivotally coupled to the upper end 466 of a respective container leg 456 mentioned earlier. Referring to FIGS. 33 and 34, the lower end 516 of the column 512 has a vertical cut face 518 formed along the diameter of the column 512. The cut face 518 terminates in first and second shoulders 520 and 522 offset by a vertical face 524. Extending transversely through cut face 518 may be a horizontally disposed hole 526. The upper end 466 of each container leg 456 is also split diametrically to form a vertical face 528 which is configured to butt against vertical cut face 518 and with a shoulder 530 to lie adjacent end 516. The upper end 466 also includes a face 532 configured to butt against face 524 when the leg 456 is oriented in the downwardly extending position. End 466 may also contain a transversely extending hole 532 configured to receive a pin (not shown) which extends through hole 532 as well as hole 526 to pivotally couple the leg 456 to the column 512. Alternatively, an integral pin may be formed in either column 512, or leg 456 which extends into a hole formed in the complementing component. The pivotal coupling of the legs 456 to the columns 512 permit the legs to be folded inwardly toward the interior of the container rim 454 once the bottom panel 452 is raised vertically and nested against the bottom of the rim. If is preferred that column 512 be of sufficient length to receive the bottom panel 452 and extend slightly past to permit the ends 516 to extend below the nested bottom panel 452. To permit the complete folding four legs 456 inwardly toward the interior of rim 454, the angular orientation of the vertical cut face 518 are different so as to ensure that the legs 456 do not interfere with each other when folded inwardly. One particular embodiment of the angular offset is described in the first embodiment shown in FIGS. 1–12. The nesting of the bottom panel 452 within the rim 454 and the folding of container legs 456 permits much more consolidated packaging for containers 450, thus reducing cost and less space for shipping.

In both of the embodiments described above, multiple tier structures may be provided and interconnected such that a rotation of one tier results in rotation of the adjacent tiers. In order to make each tier rotate about the central support assembly independently of the other tiers, each tier may be supported by two spiders and braced to prevent racking and excessive bending moments at the termini or clevis end of the arms. In the alternative, multiple single tier units may be stacked one upon another in which the weight of the containers in each tier is supported by its own base member. Alternatively, a fixed track attached to the central support assembly may be disposed between adjacent tiers wherein wheel supports at the upper and lower file support assemblies run along the track to provide support. In yet another embodiment of the invention, each tier could be independently rotated about the central support assembly by providing a substantially rigid planar platform coupled to a perpendicularly extending bearing tube which slips over the central support assembly and permits rotation of the planar support. Bulkheads or braces may be provided to interconnect the planar member and the file support tube to the bearing tube to support the outer margins of the planar member. The bulkheads would tend to prevent sagging produced by bending moments at the outer extremes of the planar member when the file containers are loaded.

Figure 35:
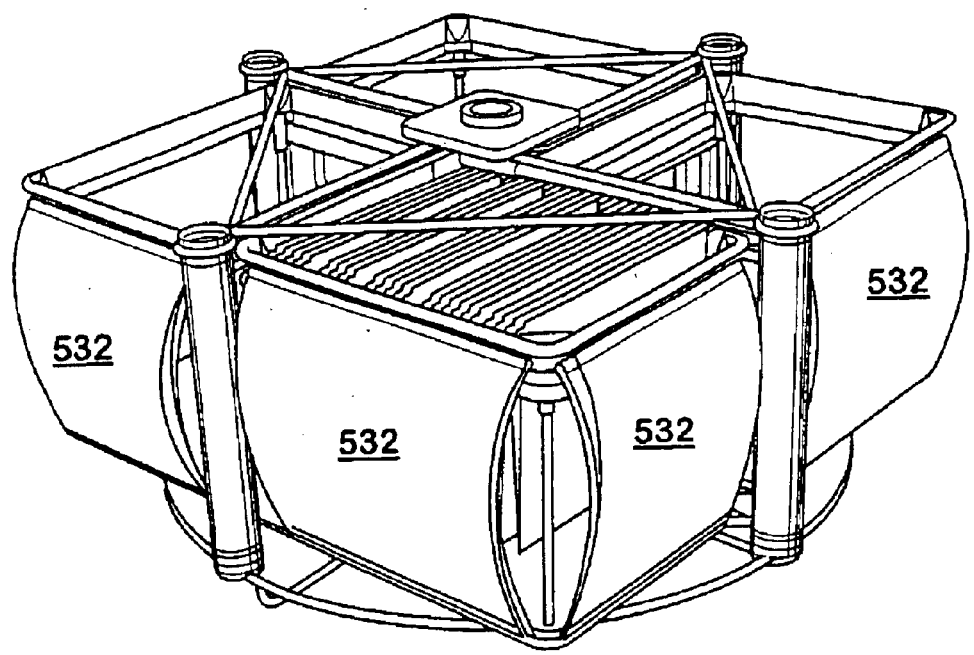
FIGS. 35–36 illustrate two examples of file container covers.
Figure 36:
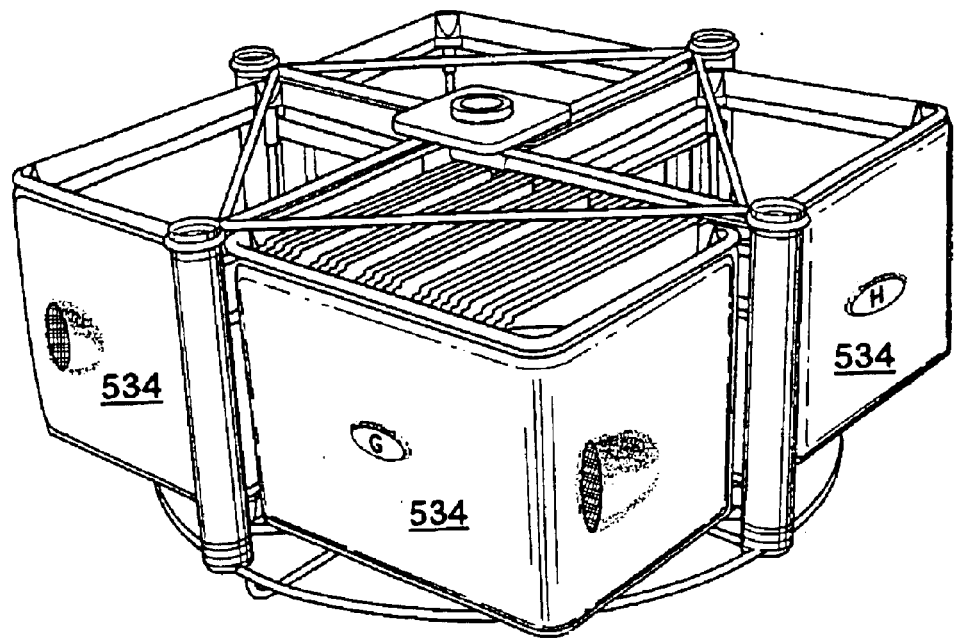

It is contemplated that in a basic form of the invention, the carrousel filing cabinet will not be enclosed, but rather accessible from all sides of the file cabinet. It is further contemplated a more aesthetic and pleasing appearance may be achieved by providing a cover 532 for each container to conceal the contents. Such covers 532 could include drapes, wraps, shrouds, hard sides, or other concealing mechanisms which extend downwardly below the rim to the lower platform. For example, flexible sheeting 534 may be detachably connected to the lower perimeter flange of rim 454 and shaped to extend around the container legs 456 to form a wall or barrier between the rim 454 and a lower platform 452. This flexible sheeting may be of substantially any color and serve to restrict access to the contents of the containers 450. The flexible sheeting may be formed from cloth, polymeric material, bent wood, perforated metal, or conventional metal sheeting. See FIGS. 35 and 36. Rather than depending from lower perimeter flange 480, covering may also be formed for each of the containers to depend from the inner perimeter flange 490 which also serves to suspend the hanging files. Alternatively, clips may be fixed to the sheeting material and attached to the interior of the rim to keep the cover in place.

One of the conceptual philosophies behind the rotary file cabinet was to provide a portable filing container which may be detached from the file cabinet assembly and transported to the work station, or to the user's place of business (vehicle, home, etc.). To achieve this goal, the containers 450 are not necessarily restricted to conventional dimensions of letter and legal size openings. For example, in the case of a letter size container, one dimension may be sufficient to accept the length of conventional writing papers, say 11½ to 12 inches while the width of the container may be substantially less, on the order of approximately 6 to 10 inches. Detachable handles may be configured which permit the user to carry the container 450 in a manner similar to a conventional briefcase or catalog case. Such a handle may similarly be made from a canvas material, leather, or metallic material of sufficient strength to support the weight and stresses associated with the handle. Additionally, given the desire to have portable containers, the covering depending from the rim 454 may have interior or exterior pockets for storing accessories such as pens and pencils, cellular telephones, envelopes, staplers, and the like. The pockets could be sewn to the cloth exterior, or could be detachably coupled using hook and loop fasteners such as those available under the brand name VELCRO™. Once back in the office, the user could then detach the cloth covering and reattach it to another file that may be taken from the file cabinet assembly.

It may also be desirable to enclose the rotary file cabinet. In such an instance, it is contemplated that a curtain or other enclosure would depend from the top of work surface 308. For example, metal sheeting may be attached to the underside of top 308 by a track such that the sheets may fully encircle the filing cabinet assembly when in the closed position. The segments may slide open to expose 90°, 180°, or 270° of the available filing space. Alternatively, rather than a metallic sliding door, a tough and durable fabric curtain may be drawn around the entire filing cabinet assembly to conceal the files.

Figure 37:
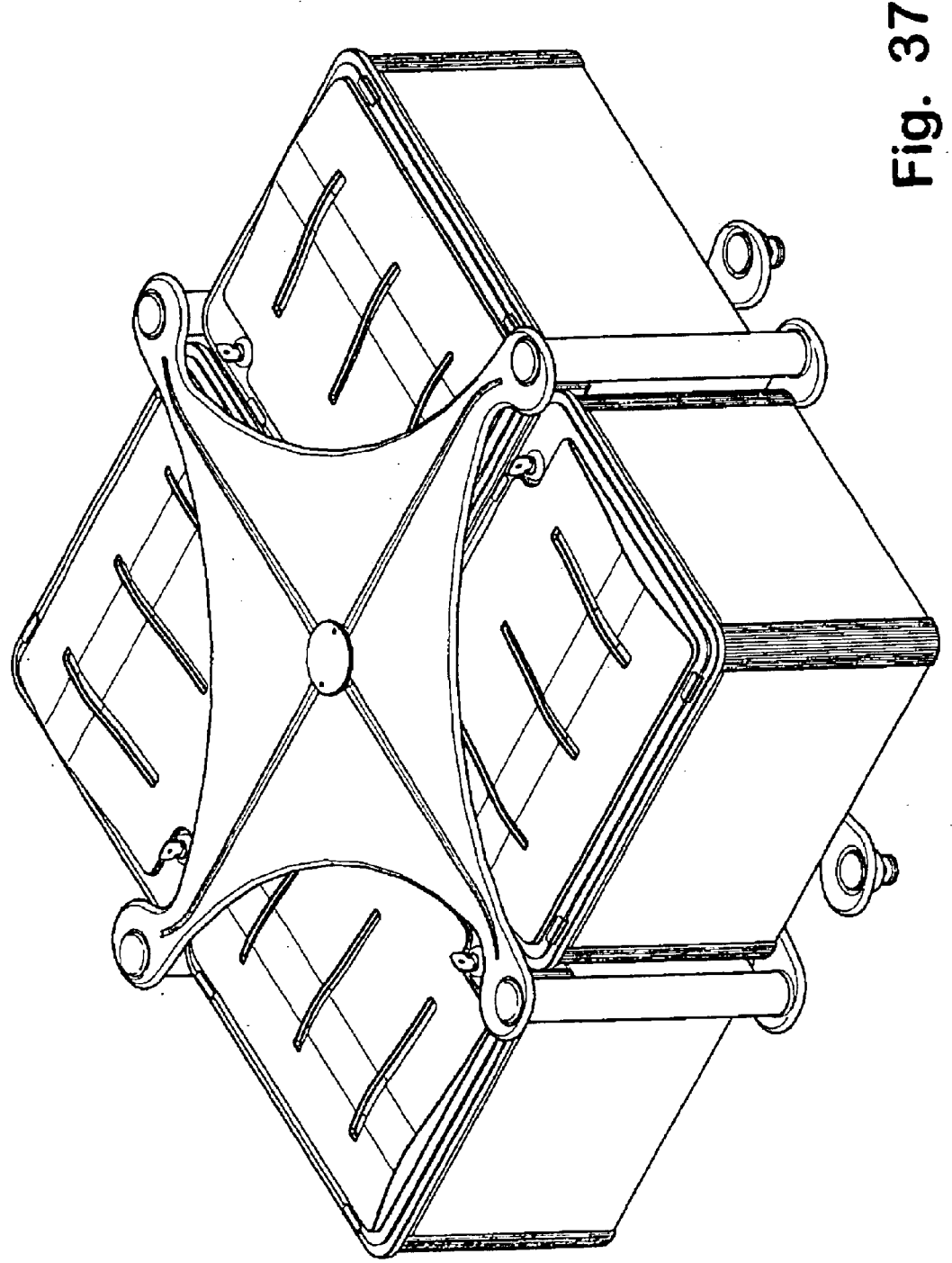
FIG. 37 is an oblique view of another embodiment of a filing system embodying the present invention.
Figure 38:
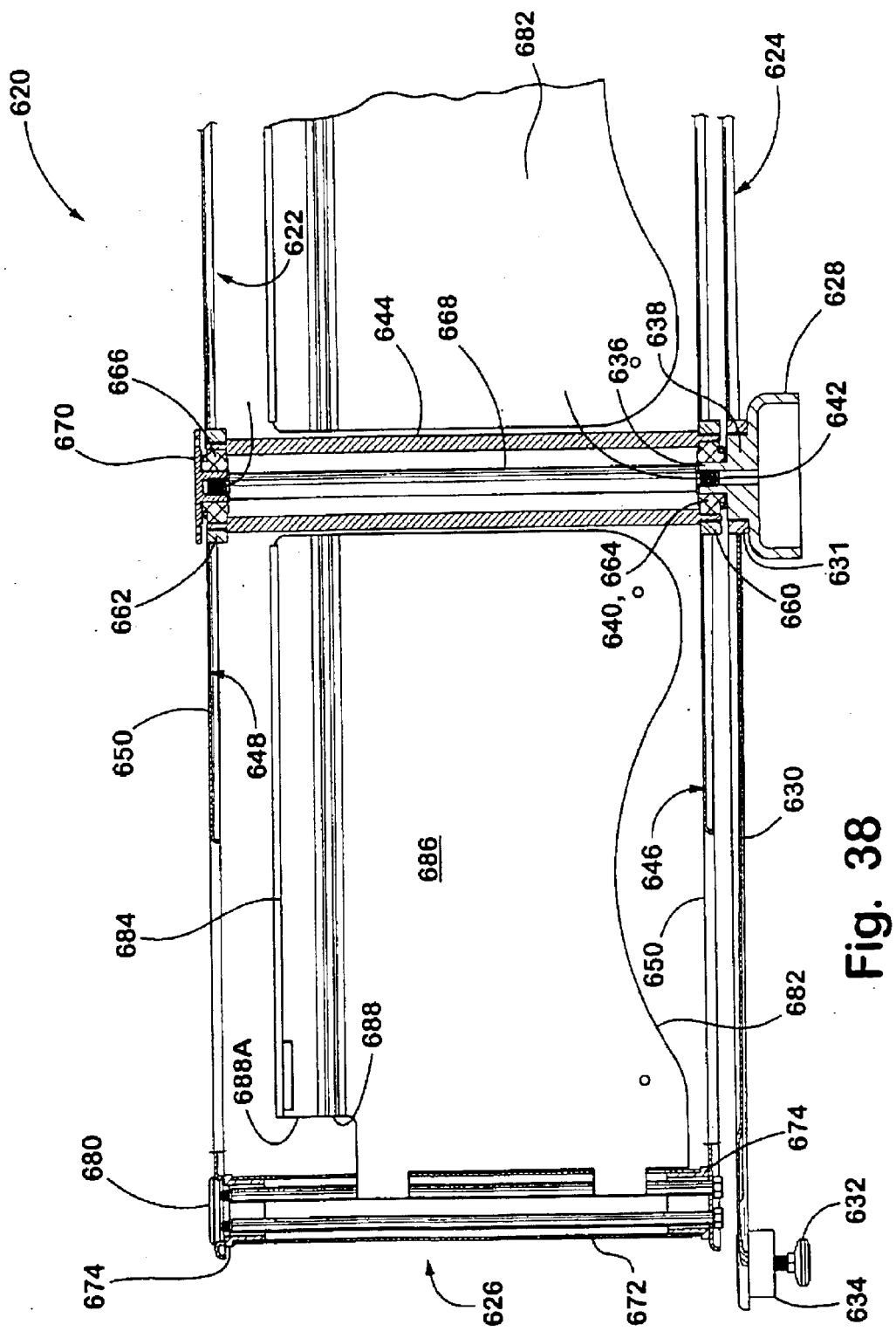
FIG. 38 is a fragmentary vertical section view of the filing system embodying the invention shown in FIG. 37.

Referring to FIGS. 37 and 38, yet another embodiment of a file assembly 620 is shown which generally includes a central carrousel assembly 622 supported above a base assembly 624, and a plurality of file support assemblies generally referenced as 626. The base assembly 624 includes a central hub 628 having a plurality of radiating spokes 630. In the preferred embodiment, a single pedestal or a plurality of evenly spaced spokes 630 are provided to produce a footprint sufficient to provide vertical stability to the file assembly 620. The ends of the spokes 630 or the pedestal perimeter are supported above the floor by adjustable glides 632 threaded into glide caps 634. The adjustable glides also permit leveling of the file assembly. Although spokes are disclosed, it should be understood that anyone of a number of different base configurations could provide the vertical stability to the file assembly, including a single piece pedestal. In the embodiment shown, the hub 628 and radiating spoke members 630 are formed from two or more separate components. The spokes are preferably formed from stamped metal or molded plastic, and may be supported, braced, or contoured along the length of each spoke to provide sufficient structural stiffness to provide vertical support for the file assembly. As shown in FIG. 38, spokes 630 radiate from a hub ring 631 concentrically located about the hub 628.

The hub 628 is generally higher in relief than the adjacent spokes 630 and in particular includes a centrally disposed upwardly extending post 636 atop a larger diameter base portion 638 from which the spokes 630 radiate. The diameter of post 626 is dimensioned to fit within the interior diameter of a bearing assembly 640 at the lower end of the central carrousel assembly 622 briefly mentioned above and described in greater detail below. The post 636 also includes a concentrically located threaded hole 642 to complete the anchoring of the central carrousel assembly 622 for reasons which will become apparent below.

Figure 39:
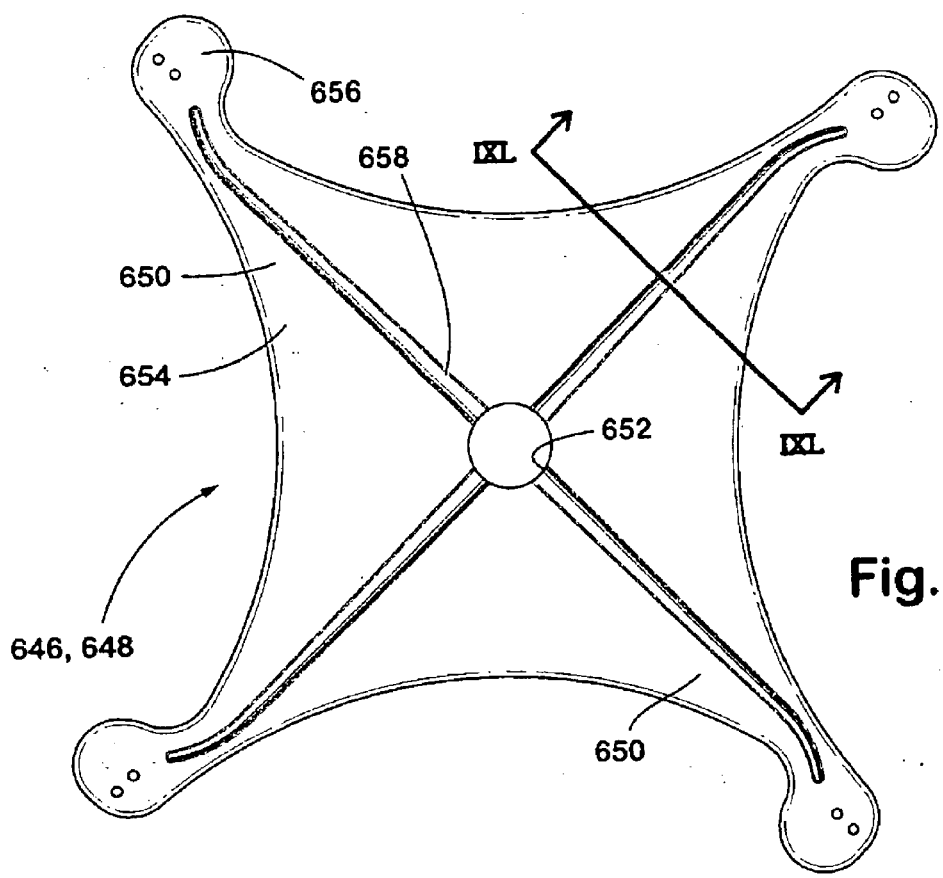
FIG. 39 is a plan view of an alternate embodiment of a spider employed in the instant invention.
Figure 40:
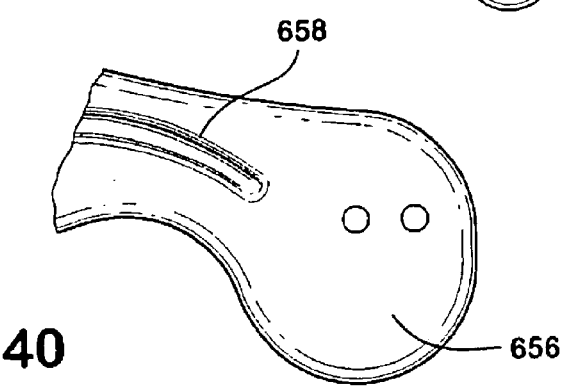
FIG. 40 is an enlargement of a portion of the plan view shown in FIG. 39.
Figure 41:
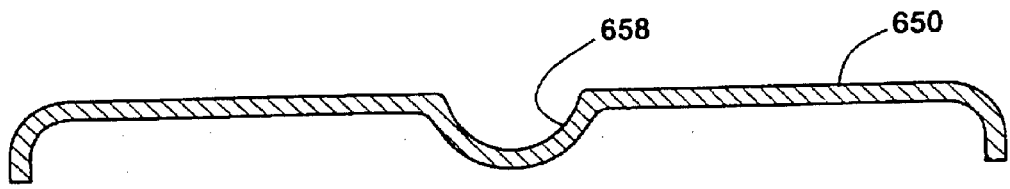
FIG. 41 is a fragmentary section view taken along line XLI—XLI shown in FIG. 39.
Figure 45:
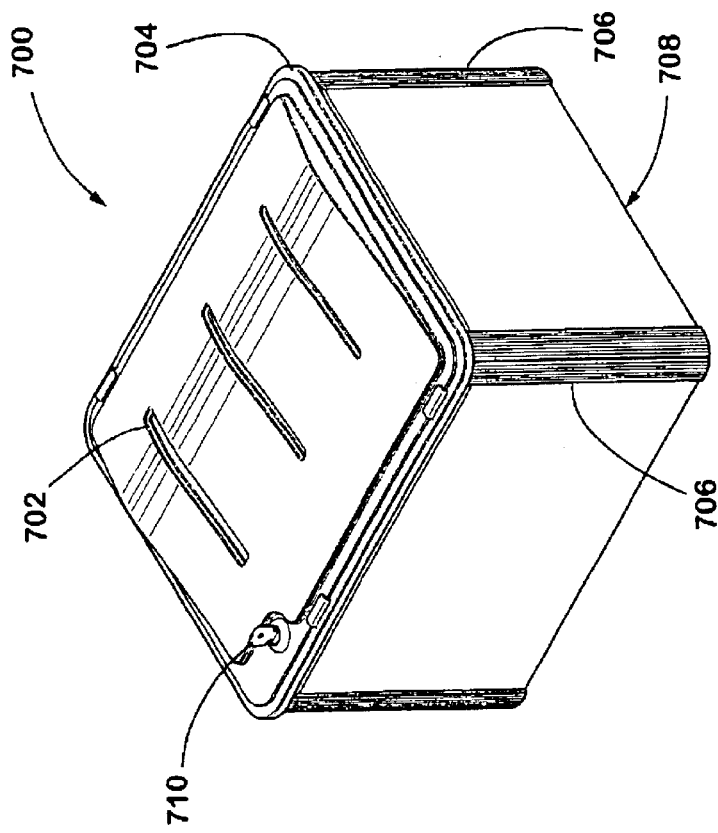
FIG. 45 is an oblique view of an alternate embodiment of a file container contemplated to be used in conjunction with the instant invention.

Referring to FIGS. 38 through 41, central carrousel assembly 622 includes a main support tube 644 having externally threaded opposite ends. Disposed at opposite ends of the main support tube 644 are lower and upper spiders 646 and 648 respectively, and arranged such that the plurality of arms 650 of each spider 646, 648 extend radially away from the main support tube 644. Each spider 646, 648 is preferably formed from steel ranging in thickness from 12 gauge to 20 gauge, most preferably about 14 gauge to 18 gauge, and most preferably 16 gauge steel plate. Referring to FIGS. 39 through 41, each spider 646, 648 includes a centrally located hole 652 having a diameter substantially equal to the O.D. of the threaded ends of the main support tube 644. Each arm 650 has a broad web-like base portion 654 which extends to form the base of the adjacent arm surrounding the central hole 652. The distal ends of each arm 650 include a lobe portion 656 which is eccentrically located off the radial axis of each arm 650. Each arm also includes a channel 658 extending along each radial axis wherein the channel depth is greatest proximate the central hole 652 and shallowest proximate the lobe portion or distal end of each arm 650. At the distal end, channel 658 becomes slightly arcuate, being bent toward the center portion of the lobe portion. The contour and arcuate profile of each channel 658 adds structural stiffness to each arm 650 and increases the bending moment each is capable of withstanding before deflection occurs. If additional stiffness is desired or required, it is contemplated that an I-beam of sufficient length, thickness, and width may be welded or otherwise formed generally along a radial axis of each arm to provide the requisite rigidity. The inboard end of each I-beam or similar support may rest against the exterior of the main support tube 644, or be received in slots defined therein to properly locate each spider.

As best illustrated in FIG. 38, each spider 646, 648 is retained on the ends of the main support tube 644 by threaded nuts 660, 662 which are welded or otherwise integrally attached to each of the spiders proximate the central hole 652. Each end of the main support tube 44 also concentrically receives a bearing assembly 664, 666 respectively. The lower bearing assembly 664, which was briefly mentioned above, receives the central post 636 and rests on the hub 628 to orient the main support tube vertically with respect to the base assembly 624. The lower and upper bearing assemblies 664, 666 respectively are maintained in compression with respect to each other, and within the ends of the main support tube 644 by one or more double-ended threaded rods or fasteners 668 wherein one end of each rod 668 is threaded into the central post 636 on the hub 628, and the opposite end is threaded into a center cap 670 adjacent the outboard side of the upper bearing assembly 666. The main support tube 644 and the attached spiders 646, 648 are permitted to rotate about the rod 668 by the bearing assemblies 664, 666. Although it is recognized that anyone of a number of different bearing structures may be utilized to support the main tube, it is preferred that tapered roller bearings be used to evenly distribute the axial load and center the main support tube. The degree of axial load on the bearings may be controlled in substantial part by the preload exerted on the rod 668 by the torque placed on the center cap 670.

Although the embodiment of the invention shown in FIGS. 37 through 42 has been described with two spiders vertically disposed along the main support tube 644, as with the above embodiments, it is contemplated that two or more tiers may be stacked vertically. In such an instance, it is contemplated that an alternative form of center cap 670 may have an identical post to that described with respect to numeral 636 located on the upper surface such that one or more support tubes 636 could be stacked on top of the first carrousel assembly 622. In such as arrangement, each pair of spiders, without more structure, would be able to rotate independently.

As best illustrated in FIGS. 38 and 42, the respective ends of the lower spider 646 are aligned vertically with the respective end of the upper spider 648, and interconnected by a file support assembly 626. Each file support assembly 626 includes a pivot tube 672 in the form of a right circular cylinder, open at opposite ends. Each end of each pivot tube 672 receives a bushing 674, preferably formed from a self lubricating polymeric material or other suitable material to permit rotation of the pivot tube with respect to the ends of the spiders 646, 648. The ends of the respective spiders 646, 648 are kept in alignment with each of the pivot tubes by two bolts 676, 678 which pass through holes in the distal ends of the lower and upper spiders 646, 648. In a preferred embodiment, the threaded ends of the bolts 676, 678 are retained in a pivot tube cap 680 located on each of the ends of the upper spider 648. In this manner, the degree of compression by the lower and upper spider arms 646, 648 on the intervening pivot tube 672 can be adjusted to some extent by tightening the bolts interconnecting the spider ends.

Each file support assembly 626 further includes a pivot arm 682 which extends radially from each pivot tube 672. In the preferred embodiment, each pivot arm 682 is formed from a stamped sheet of steel or other suitable strength material providing a rigid, generally planar body. See FIGS. 43 and 44. The upper edge 684 of each pivot arm is curved or bent to be laterally offset, yet generally parallel to that of the primary body 686, to provide an edge for hanging containers described in greater detail below. The upper edge 684, proximate the pivot tube 672 also includes a punched or cut-out portion 688 to provide a shoulder 688a to retain the containers, described below, from sliding off each pivot arm. With respect to the edge of the pivot arm in contact with the pivot tube 672, tabs 694 are provided which are received in slots formed in the side of each pivot tube 672. Each pivot arm 682 is preferably welded or otherwise permanently attached to each pivot tube 672 to withstand a substantial moment on the cantilevered arm. The tabs 694 extending into the interior of the pivot tube interfere with the bolts 676, 678 in a manner to limit the rotational extent of each pivot arm 682. As will become readily apparent below, other mechanisms may be included in the interior of each file support assembly to temporarily locate the rotational position of the pivot arm. All of these structures are intended to provide rotary access to all of the containers in the file assembly without orienting or positioning the file assembly in a particular manner. It is also desired to place sufficient restrictions on each pivot arm such that centrifugal forces do not cause the pivot arms to extend or pivot about the pivot tubes when the central carrousel assembly is rotated. However, it is also preferred the operator can easily swing the pivot arms out from the central carrousel assembly when desired to remove or replace a particular container.

Proximate the lower edge 690 of each pivot arm 682, and extending from each pivot arm in a direction of the offset of the upper edge 684, are bumpers 692. The bumpers 692 are intended to support a lower portion of any container suspended from the upper edge 684 of each pivot arm, to keep the container in a preferred orientation while on the file assembly. The bumpers 692 are preferably formed from a resilient material and also serve to cushion any impact the containers may have against the pivot arm 682 when hung therefrom.

Figure 46:
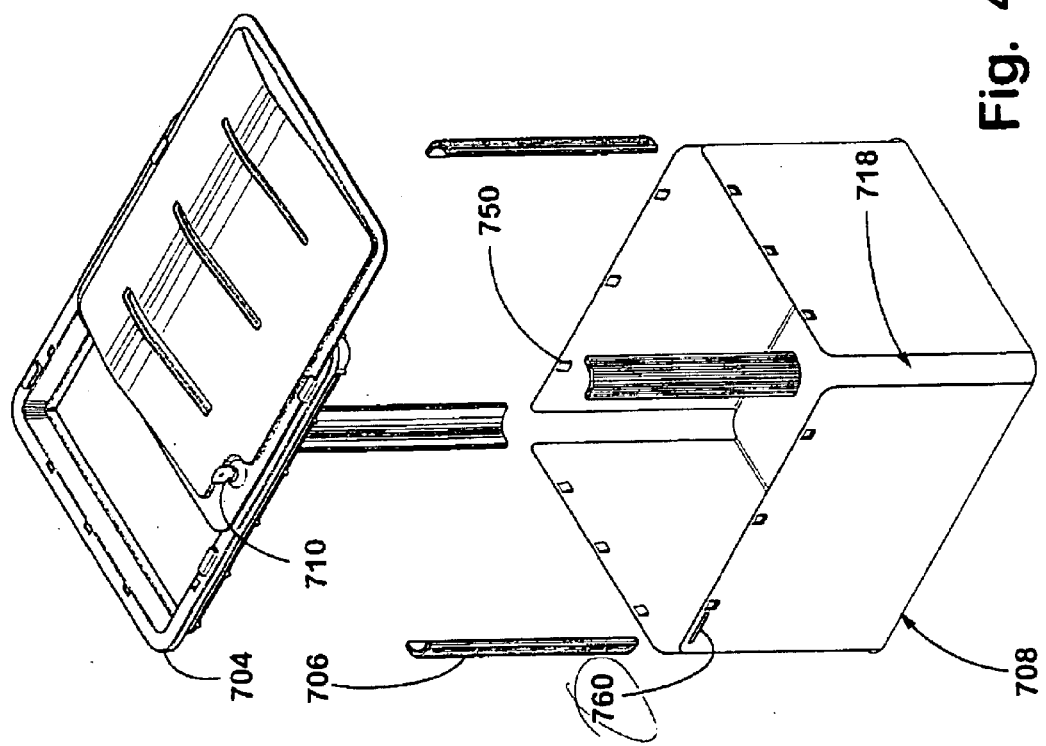
FIG. 46 is an exploded view of the file container shown in FIG. 45.
Figure 51:
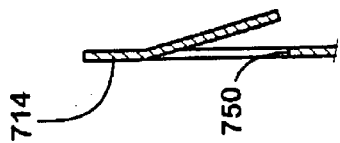
FIG. 51 is a detailed fragmentary side view of the portion of the wall panel shown in FIG. 50.
Figure 50:
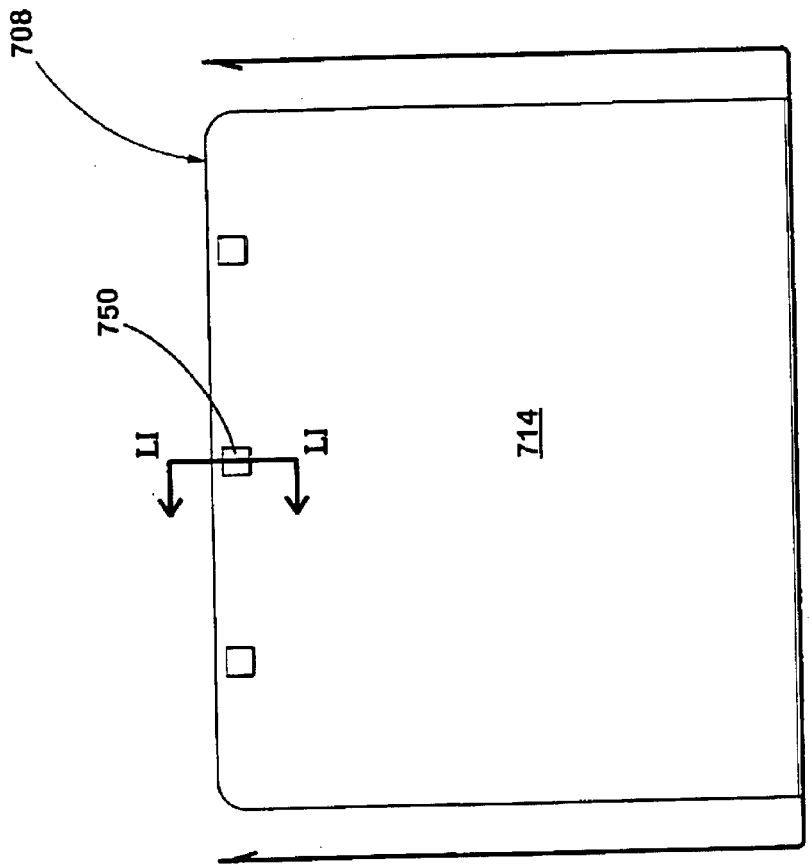
FIG. 50 is an elevation view of the wall panels.

Another unique container assembly 700 for use in conjunction with the file assembly described above is illustrated in FIGS. 48 through 57. Each container 700 includes a top 702, a frame 704 for receiving the top 702, a plurality of corner members 706 and a box assembly 708. In addition, a lock assembly 710 is available to lock the top in a closed position. As best illustrated in FIG. 46, the box assembly 708 is preferably formed from flat metal stock such as aluminum, stamped in a manner to provide a central bottom panel 712 integrally connected to a plurality of side panels 714 along hinge lines 716. The plurality of side panels 714 are folded along each of the hinge lines 716 such that the side panels 714 are oriented generally perpendicularly to the bottom panel 712. When in the folded and upright position relative to the bottom panel 712, a gap 718 remains between adjacent side panels 714 at each corner of the box assembly 708.

Figure 48:
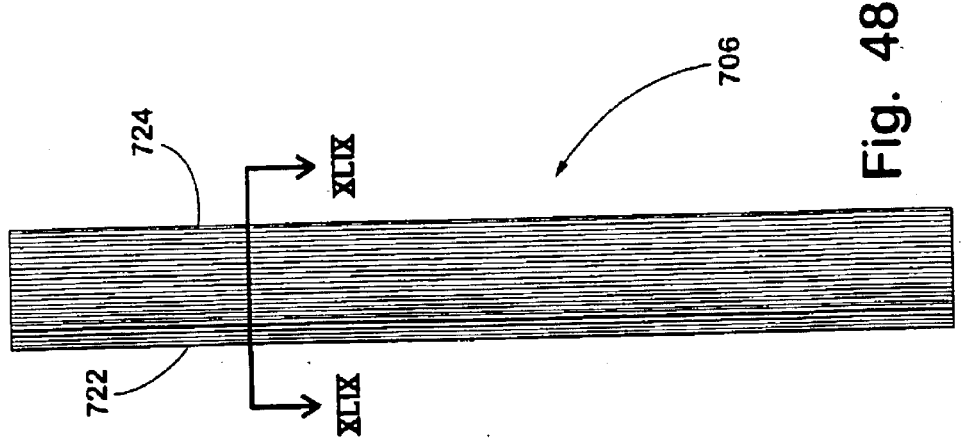
FIG. 48 is an elevation view of a corner member.

Interconnecting adjacent side panels 714 and filing each of the gaps 718 of the box assembly are the corner members 706. In a preferred embodiment each corner member 706, shown in FIGS. 48 and 49, is extruded from a polymeric material having a relatively high durometer hardness such that each corner member 706 is substantially rigid. The exterior surface 720 is preferably ribbed although any one of a number of different textures may be formed. In addition, any one of a number of configurations may be adopted ranging from right angle transverse cross sections to very rounded cross sections, so long as the edges 722 and 724 of each corner member are able to interconnect the adjacent side panels 714. In the embodiment shown in FIG. 46, a radiused configuration is shown having inner and outer walls 726 and 728, respectively, interconnected by two spaced apart bulkheads 730. The bulkheads 730 are spaced inwardly from edges 722 and 724. A c-shaped channel 732 is formed by a longitudinal slot 734 extending the length of each edge 722, 724 which is configured to receive an edge of one of the adjacent side panels 714—the edge of each side panel extending no further into each channel 732 than to bulkheads 730. Although polymeric materials are disclosed for forming each of the corner components, other materials may be used as well, including aluminum and other extrudable metals.

Figure 52:
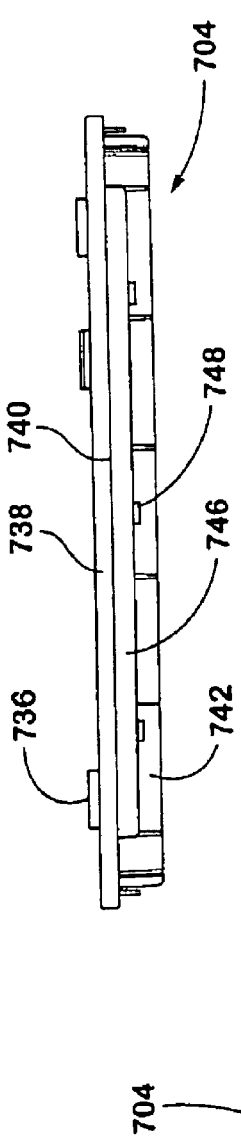
FIG. 52 is a side elevation view of a file container frame.
Figure 53:
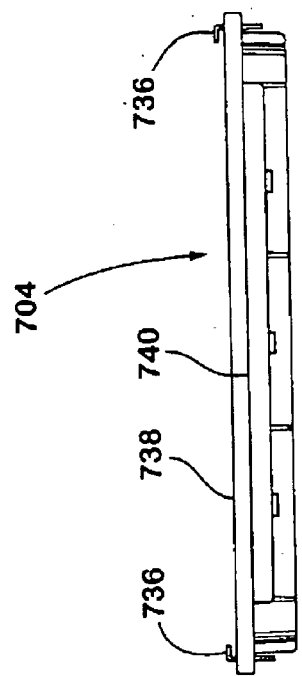
FIG. 53 is an end elevation view of the file container frame shown in FIG. 52.
Figure 54:
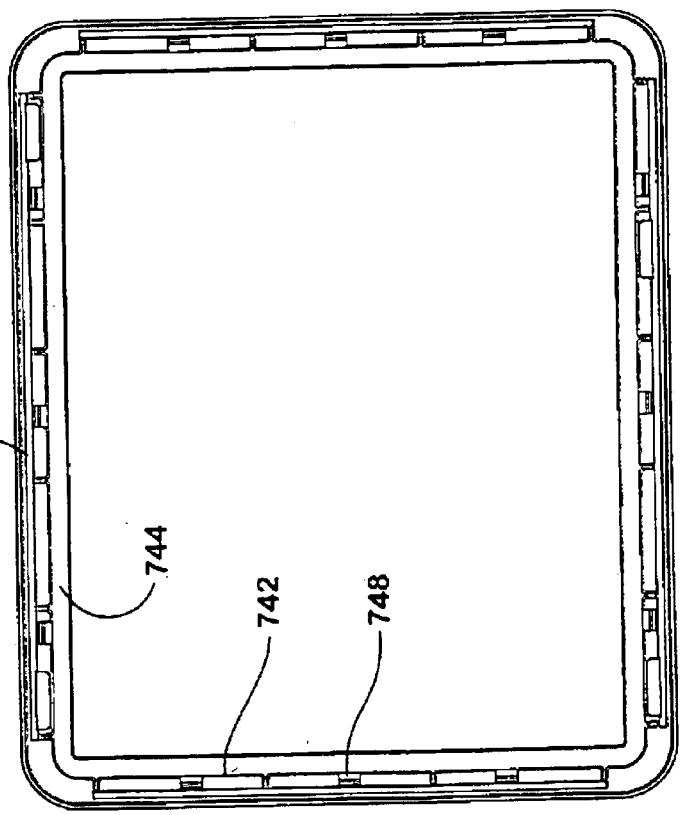
FIG. 54 is a bottom plan view of the file container frame shown in FIGS. 52 and 53.

FIGS. 52 through 54 provide a better illustration of the frame 704 which is intended to be attached to the upper edges of the side panels 714 to provide a substantially rigid container. In the embodiment shown, frame 704 is generally rectangular, although other forms may be used, and includes a plurality of spaced apart flanges 736 formed on the upper surface 738 of the rim 740. The flanges 736 are arranged to provide channels around a substantial portion of the rim 740. Extending inwardly from an inner wall 742 towards a center of the frame 706 is a race 744 having an upwardly turned inner edge. The race 744 is positioned below the upper surface 738 of the rim 740 to provide a surface for supporting hanging folders such as those available from PENDAFLEX™. Below the race 744, and spaced outboard from inner wall 742 is an outer wall 746, the gap between the inner and outer walls 742, 746 is intended to receive the upper edge of each of the side panels 714. To retain the rim 740 of the frame 706 on the upper edge of the side panels 714, a plurality of detents or bosses 748 are defined on the inner and/or outer walls, a plurality of which are intended to engage in snap-fit arrangement a like plurality of holes 750 formed in each of the side panels 714. The holes 750 are preferably formed during the stamping or forming process of the box assembly 708. A side view of one such hole 750 in one of the side panels 714 is illustrated in a fragmentary side view in FIG. 47. The frame 704 is received on the top of the plurality of side panels 714 such that the upper edge of the side panels, nor the detents 748, is not exposed, in effect creating a substantially permanent attachment of the frame to the upper edge of the box assembly, and any sharp edges of the box assembly are concealed behind the inner and outer walls 742, 746, respectively. It is contemplated that plastic injection molding is the best mode for manufacturing the frame although is seems possible that other methods and materials may also be used, including stereo lithography, machining, milling, and a form of stacked or layering construction of plastics, metal, or wood.

The top, shown in FIGS. 46 and 55 through 57, is also preferably formed using plastic injection molding methods. In the embodiment shown, the top 702 includes an perimeter flange 752 substantially surrounding a generally raised or arched central portion 754. To provide structural rigidity to the relatively large expansive raised central portion, grooves 756 are formed in the material at an angle to the long axis of the top. Together with the contours formed at the opposite ends of the raised central portion, the central portion 754 becomes substantially rigid, enabling the top 702 to be received in sliding engagement with the frame 704, the perimeter flanges 752 constrained by the flanges 736 on the rim 740.

To provide a relatively secure container, it is contemplated a lock assembly 710 may be mounted in portion of the top 702 proximate one of the corners. To accommodate a lock such as 710, one of the perimeter flanges 752a is extended and provided with a hole 758 for receiving the lock assembly 710. In a conventional manner, the lock 710 is retained by a nut on the underside of the flange 752a and equipped with a bar which rotates into engagement with a slot formed in the inner wall of the frame, preventing the top from sliding open. To provide a more secure arrangement, the bar of the lock 710 may extend through a slot 760 defined in the upper edge of one of the side panels such is illustrated in FIGS. 46 and 47.

As mentioned briefly above, it is the intention of this invention to suspend one or more of the container assemblies on the pivot arms 82 such that the containers may swing between a stored and extended position on the central carousel assembly. To achieve this goal, the frame 704 of each container assembly 700 also includes a channel 760 defined between the inner and outer walls 742, 746, respectively, capable of receiving the upper edge 84 of any given pivot arm 82. Moreover, it is contemplated that channel 760 have a vertical profile which mirrors the vertical profile of the upper edge 84 such that a portion of the frame 704 is received within the cut-out and precludes the container 700 from sliding along the arm's upper edge 84. It is also contemplated that the cut-out 88 also makes accommodation for the bar of any lock assembly 710 when stored in the locked position.

This last embodiment provides the same advantages of the prior embodiments of this invention. The invention provides a file cabinet which is not subject to tipping over when one or more file drawers are in the open position. A further advantage is that the circular rotation of the filing cabinet permits access to otherwise inaccessible space in certain office environments. Another advantage provided by this system is that two or more units may be stacked vertically upon each other to achieve the necessary storage space. Yet another advantage is that the entire filing cabinet may be shipped in a disassembled state and assembled by the end user without the need for special tools. Thus, the entire assembly may be shipped in a smaller container than conventional filing cabinets, reducing the cost of shipment and providing a less expensive product. A further advantage of the instant invention is that the file containers may be easily transported from the office to the car, or to long term storage without a need to remove the contents to other containers. Moreover, each of the containers may be secured whenever desired by providing each container with a lock assembly. The versatility provided by the transportable containers, coupled with the modular, easy to assembly nature of the different components, permits the instant invention to be sold to a wide arrange of customers, using much less shipping space than prior file storage systems. Moreover, the entire assembly is easily disassembled in the event the units are to be moved long distances.

Figure 58:
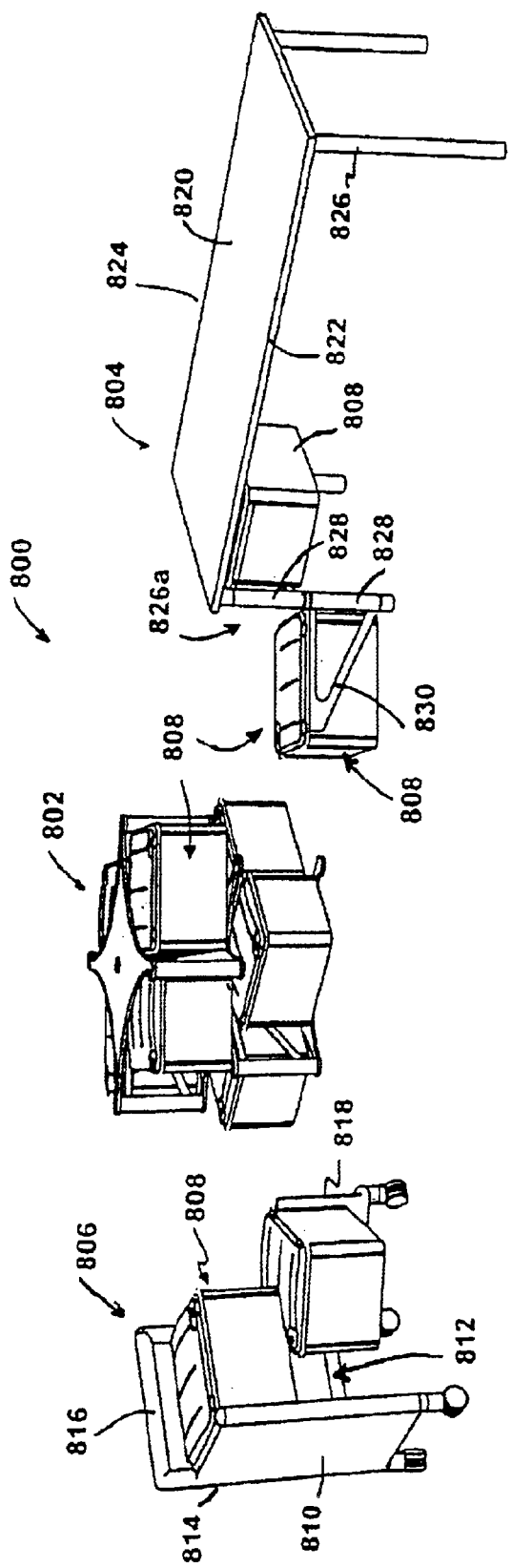
FIG. 58 is an oblique view of an office environment utilizing a file system of the instant invention.

The various embodiments of the carrousel file system described above form a part of an overall filing system 800 particularly suited for open office environments such as that shown in FIG. 58. The carrousel file assembly, generally identified by reference numeral 802, forms a regional filing hub for the office which as shown in FIG. 58 and includes a plurality of work stations 804 arranged in a predetermined pattern within the office space. The office space may include a plurality of regional hub filing systems 802 for providing localized access to files not contained in the main filing or longer term filing facility generally referred to as the main filing room. As shown in FIG. 58, the carrousel filing hub 802 is stationary at least with respect to its location within the office space and is centrally located with respect to a plurality of workstations 802.

Interconnecting each of the carrousel regional filing hubs 802 with the work stations 804 are one or more satellite filing systems generally designated by the reference numeral 806. Files stored in storage containers 808 temporarily stored on each carrousel filing hub 802 may be transferred to the satellite filing system 806 for transport to the workstation 804, or temporarily stored thereon for use near a workstation 804 or elsewhere.

In a preferred embodiment, each satellite filing system 806 includes at least two upright walls or sides 810, 812 arranged generally perpendicular to each other and interconnected along a common edge 814, one of the sides such as side 812 having a handle 816 located along an upper edge. In the preferred embodiment, a third side 818 has one edge pivotally coupled to another edge of the back side wall 812 in a manner which permits pivotal movement of the side 818 from a position perpendicular to side 812, to a second position coplanar with side 812. Pivoting side 818 may range in height from that generally equal to sides 810 and 812, or my be shorter such as shown in FIG. 58. Casters or rollers may be attached to the lower ends of the sides 810, 812 and 818 such that the satellite filing system is moveable. Moreover, sides 810 or 812, and side 818 preferably have mounting assemblies extending therefrom which are configured to interact with the filing containers 808 such that the filing containers 808 may be carried thereon so they may be transported to and from the main filing room, the regional carrousel hub 802, or the workstations 804. Alternatively, the satellites may provide short term filing solutions adjacent the regional carrousel hub 802 or workstation 804.

Another portion of the overall filing system 800 is located at the workstations 804. As shown, each workstation includes a work surface 820 having a perimeter edge defining a front edge 822, a back edge 824, and supported above a reference plane such as the floor by a plurality of legs 826. Preferably, one of the legs 826a proximate the front edge 822 has at least one, and preferably two sleeves 828 which pivot about a vertical axis coincident with each leg 826. Each sleeve in turn has an arm 830 extending therefrom which provides a mounting assembly for receiving one of the file containers 808. The pivoting action of each sleeve 828 permits the user to rotate each of the arms 830 and attached file containers 808 between a stowed position beneath the work surface 820, and an extended position out from underneath the work surface 820 to enable the user to place or remove the file container 808 relative to the arm 830, or access the contents of the file container 808.

In operation, the user places documents and other materials for long or short term storage and filing in the storage containers 808, and depending upon the term of storage places the container in one of the main file room, the regional carrousel file hub, the satellite, or the workstation filing location. If a file it to be moved from the user's workstation 804 to the regional carrousel file hub 802, the user may remove the file 808 from the appropriate hanger arm 830 and move the container to the satellite cart (mobile pedestal file) 806, and use the cart 806 to transport the file container 808 to the regional carrousel file hub 802 and place it in an appropriate bay. Alternatively, if the container is one which is not accessed very often, but the user does not wish the file container 808 to be too far from the workstation 804, the user may use the satellite cart 806 as an intermediate storage location, or move the satellite 806 from workstation to workstation, depending upon where the user's requirements dictate. Moreover, the satellite cart 806 could be used to transport file containers 808 from the regional carrousel file hub 802 to the main file room. In short, the file container 808 can easily be transported from the main file room, to a regional filing location, a satellite filing location, and workstation specific location, as well as a myriad number of locations in between. Once at the desired location, the file container 808 may be stowed on a pivoting arm to move the file container 808 temporarily out of the way.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention as interpreted according to the principles of patent law, including the doctrine of equivalents.

We claim:

1. A container adapted in the alternative to serve as an independent storage container or be suspended on a file hanger in a filing cabinet comprising:
   a box assembly having a bottom panel and a plurality of side panels, said side panels formed integral with and extending from said bottom panel and adapted to be folded to an upright orientation relative to said bottom panel to form said box assembly;
   a corner member configured to be received between adjacent ones of said plurality of side panels and stabilize said upright orientation of said plurality of side panels;
   a frame attached to an upper edge of said plurality of side panels in snap-fit engagement, said frame having a central opening and at least one channel defined in a peripheral edge of said frame, said at least one channel adapted to receive the file hanger in the filing cabinet and suspend said box assembly therefrom;
   a lid configured to close said central opening of said frame; said lid adapted to receive a lock assembly for selectively securing said lid over said opening of said frame.

2. A container configured to be suspended from at least one file hanger, comprising:
   a bottom pane;
   a plurality of side panels coupled to said bottom panel;
   a corner member slidably received between adjacent ones of said plurality of side panels for interconnecting said adjacent ones of said side panels;
   a frame coupled to an upper edge of said plurality of side panels in snap fit engagement, said frame having at least one exterior perimeter channel adapted to receive an upper edge of the file hanger and suspend the container therefrom;
   a top to be received in sliding engagement on an upper surface of said frame; and
   a lock assembly disposed in said top and selectively engaging said frame.

3. The container as defined in claim 2, further comprising a mechanical mechanism in said at least one channel for engaging a cut-out formed in said upper edge of the file hanger for preventing the container from sliding along said upper edge of the file hanger.

4. The container as defined in claim 2, wherein said frame includes at least one channel along an upper outside edge of the container perimeter for suspending said frame from at least one file hanger arm.

5. The container as defined in claim 2, wherein said frame comprises at least one channel slide on its upper surface for receiving said top in sliding engagement.

* * * * *